(12) United States Patent
Rycroft et al.

(10) Patent No.: US 11,510,300 B2
(45) Date of Patent: Nov. 22, 2022

(54) DETERMINNING LIGHT EFFECTS BASED ON VIDEO AND AUDIO INFORMATION IN DEPENDENCE ON VIDEO AND AUDIO WEIGHTS

(71) Applicant: SIGNIFY HOLDING B.V., Eindhoven (NL)

(72) Inventors: Simon Rycroft, Eindhoven (NL); Dzmitry Viktorovich Aliakseyeu, Eindhoven (NL); Tobias Borra, Rijswijk (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/290,977

(22) PCT Filed: Oct. 28, 2019

(86) PCT No.: PCT/EP2019/079345
§ 371 (c)(1),
(2) Date: May 3, 2021

(87) PCT Pub. No.: WO2020/089144
PCT Pub. Date: May 7, 2020

(65) Prior Publication Data
US 2022/0039239 A1    Feb. 3, 2022

(30) Foreign Application Priority Data
Nov. 1, 2018 (EP) ...................................... 8203932

(51) Int. Cl.
*H05B 47/105* (2020.01)
*H05B 47/155* (2020.01)
*H05B 47/165* (2020.01)

(52) U.S. Cl.
CPC ......... *H05B 47/105* (2020.01); *H05B 47/155* (2020.01); *H05B 47/165* (2020.01)

(58) Field of Classification Search
CPC .. H05B 47/105; H05B 47/155; H05B 47/165; H05B 47/19; H04N 21/85; H04N 21/24
See application file for complete search history.

(56) References Cited

U.S. PATENT DOCUMENTS

2010/0265414 A1* 10/2010 Nieuwlands ..... H04N 21/44008
348/739
2015/0002046 A1    1/2015 Schlangen

FOREIGN PATENT DOCUMENTS

JP    S64073385 A    3/1989
WO    2006003624 A1    1/2006
(Continued)

*Primary Examiner* — Daniel D Chang

(57) ABSTRACT

A method of determining light effects based on analysis of media content comprises allowing (401) a user to influence a video weight and an audio weight. The video weight represents a weight of video content in the determination of the light effects and the audio weight represents a weight of audio content in the determination. The method further comprises obtaining (405) information relating to the video content and/or information relating to the audio content, determining (407) the light effects to be rendered while the media content is being rendered. The method also comprises storing a light script specifying the light effects and/or controlling (409) one or more light sources to render the light effects. The light effects are determined based on the information relating to the video content in dependence on the video weight and based on the information relating to the audio content in dependence on the audio weight.

15 Claims, 16 Drawing Sheets

(56) References Cited

FOREIGN PATENT DOCUMENTS

| | | |
|---|---|---|
| WO | 2007/119277 A1 | 10/2007 |
| WO | 2007123008 A1 | 11/2007 |
| WO | 2017162469 A1 | 9/2017 |

* cited by examiner

DETERMINNING LIGHT EFFECTS BASED ON VIDEO AND AUDIO INFORMATION IN DEPENDENCE ON VIDEO AND AUDIO WEIGHTS

CROSS-REFERENCE TO PRIOR APPLICATIONS

This application is the U.S. National Phase application under 35 U.S.C. § 371 of International Application No. PCT/EP2019/079345, filed on Oct. 28, 2019, which claims the benefit of European Patent Application No. EP18203932.1, filed on Nov. 1, 2018. These applications are hereby incorporated by reference herein.

FIELD OF THE INVENTION

The invention relates to a system for determining one or more light effects based on an analysis of media content, said media content comprising video content and audio content.

The invention further relates to a method of determining one or more light effects based on an analysis of media content, said media content comprising video content and audio content.

The invention also relates to a computer program product enabling a computer system to perform such a method.

BACKGROUND OF THE INVENTION

A dynamic lighting system, such as Philips Hue Entertainment, can dramatically influence the experience and impressiveness of audio-visual material, especially when the audio-visual material is synced with a light script that constitutes an intelligent interpretation of the source material. However, manual creation of a light script can be a daunting task.

For this reason, methods exist to automatically generate a first light script from the source content. The first light script can then be rendered as-is or undergo further manual editing. Prior to, or during the automatic scripting process, there are certain parameters which may be set or changed by a user. These parameters may be set globally for the whole script generation process.

However, there many different ways in which light settings to be specified in a light script can be determined. For example, WO 2017/162469A1 discloses a controller which determines items of metadata associated with an audio stream, performs an image search (e.g. a Google search) based on the metadata, and uses the resulting images to determine light settings for the lighting devices, e.g. hue/brightness/saturation.

US2010/265414A1 discloses a method for controlling an ambient lighting element including determining ambient lighting data to control an ambient lighting element. The method includes processing combined ambient lighting data, wherein the combined ambient lighting data is based on corresponding video content portions and corresponding audio content portions. The processed combined ambient lighting data may then be used to control an ambient lighting element. Video-based ambient lighting data and audio-based ambient lighting data may be combined to produce the combined ambient lighting data. Combining the video-based and audio-based ambient lighting data may include modulating the video-based ambient lighting data by the audio-based ambient lighting data.

Although known automatic scripting methods reduce the amount of user input, the resulting light scripts often do not fit well with the content for/from which the lights script were generated.

SUMMARY OF THE INVENTION

It is a first object of the invention to provide a system, which is able to determine light effects that fit the video content for which they are determined without requiring a significant amount of user input.

It is a second object of the invention to provide a method, which is able to determine light effects that fit the video content for which they are determined without requiring a significant amount of user input.

In a first aspect of the invention, a system for determining one or more light effects based on an analysis of media content, said media content comprising video content and audio content, comprises at least one input interface, at least one output interface, and at least one processor configured to use said at least one input interface to allow a user to influence a video weight and an audio weight used for a determination of one or more light effects, said video weight representing a weight of said video content in said determination of said one or more light effects and said audio weight representing a weight of said audio content in said determination.

Said at least one processor is further configured to use said at least one input interface to obtain information relating to said video content and/or information relating to said audio content, determine said one or more light effects to be rendered on one more light sources while said media content is being rendered, said one or more light effects being determined based on said information relating to said video content in dependence on said video weight and being determined based on said information relating to said audio content in dependence on said audio weight, and use said at least one output interface to control said one or more light sources to render said one or more light effects and/or store a light script specifying said one or more light effects.

By using information derived from the audio, e.g. music, that accompanies visual content (e.g. theme music in a movie or series) to drive the parameters of automatic light script creation for certain pieces or portions of content, the determined light effects may fit better with these certain pieces or portions of content. Meta data related to music (e.g. from existing audio meta data services like Spotify, e.g. parameters such as valence, energy, and danceability, or by local analysis of the raw audio data) may be used to determine, by applying a set of rules, the parameters for automatic light script creation (for example, the type of color extraction method used, transition speed and/or spatial distribution).

By allowing a user to control the balance of influence between audio, e.g. music, and screen parameters toward the resulting light script, a better contextual accuracy of light script extraction may be achieved, thereby reducing the time a user would need to spend on manual adjustment of the light script. In case of real time light effect creation (e.g. Philips HueSync), a similar balancing control might be presented to the end user.

Said system may be part of a lighting system which comprises said one or more light sources or may be used in a lighting system which comprises said one or more light sources, for example. Said information related to audio content may be extracted from said audio content and/or obtained from an Internet server and/or said information related to said video content may be extracted from said video content and/or obtained from an Internet server.

Said information related to said audio content may comprise harmony, valence, energy, mood, and/or danceability information, for example. Said information related to said video content may comprise color information, for example. Said audio weight may be a music weight, i.e. only used to weigh how light effects are determined based on information relating to music content, or said audio weight may also be applied to other types of audio, e.g. speech and/or audio effects.

The user may be able to specify and/or to adapt both the video weight and the audio weight or the user may be able to specify and/or to adapt one of the two weights. In the latter case, after the user has specified or adapted the first weight, the second weight may be determined automatically based on the first weight. The user may specify a single value or a plurality of values, e.g. a range, for a weight. If the user specifies a plurality of values, the system itself may choose one of these values, e.g. depending on the type of audio content, on what channel(s) music is being played and/or on the type of video content. For example, if a certain scene in the movie is very colorful such that the trimean or dominant color does not represent the video content well, the system might decide to go for more audio influenced color, even if the user, for example, selected similar audio and video weight ranges.

Said video weight may comprise a plurality of weight components for different types of video information and/or said audio weight may comprise a plurality of weight components for different types of audio, e.g. music, information. This allows the user to more precisely specify his preferences.

Said at least one processor may be configured to determine whether said video weight and said audio weight have certain values non-zero, determine whether a light script is available for said audio content and use said at least one output interface to control said one or more light sources to render light effects specified in said available light script upon determining that said video weight and said audio weight have said certain non-zero values and said light script is available. For example, if a movie comprises a certain song and a light script is available for this song, a nice entertainment experience may be provided if the user does not prefer the use of only audio, e.g. music, information or only video information.

Said at least one processor may be configured to determine whether said audio content comprises more than a certain amount of dialogue and use said at least said at least one output interface to control said one or more light sources to render said light effects specified in said available light script upon determining that said video weight and said audio weight have said certain non-zero values, said light script is available and said audio content comprises not more than said certain amount of dialogue. For example, if there is more than a certain amount of dialogue in a movie, a light script relating to a song playing in the background may be less desirable.

Said at least one processor may be configured to determine said one or more light effects by determining a color, a start time and a duration of each of said one or more light effects. Said start time and said duration of said one or more light effects may be determined such that said one or more light effects are synchronized with beats, bars, and/or a rhythm of music in said audio content if said video weight has a zero value. This allows the one or more light effects to be based on only audio information.

Said at least one processor may be configured to further determine said one or more light effects by assigning each of said one or more light effects to at least one of said one or more light sources. For example, from which part of the video content and/or from which part of the audio content a light effect is determined for a certain light source may depend on the spatial position of the light source.

Said information related to said video content comprises color information extracted from said video content and said at least one processor may be configured to determine colors from said color information by using a certain color extraction method. Determining light effects based on colors extracted from video is a good way of determining light effects from video.

Said certain color extraction method is selected based on said information related to said audio content if said video weight has a certain non-zero value and said audio weight has a certain non-zero value. Thereby, the one or more light effects are determined based on both audio and video information.

A first color extraction method may be selected if said information related to said audio content comprises a first energy value and a second color extraction method may be selected if said information related to said audio content comprises a second energy value, said second energy value being higher than said first energy value and said second color extraction method involving a lower degree of smoothing than said first color extraction method. This is a beneficial manner of determining light effects based on both audio and video information.

A first color extraction method may be selected if said information related to said audio content comprises a first valence value and a second color extraction method may be selected if said information related to said audio content comprises a second valence value, said second valence value being higher than said first valence value and said second color extraction method determines colors which are more saturated than colors determined by said first color extraction method. This is a beneficial manner of determining light effects based on both audio and video information.

In a second aspect of the invention, a method of determining one or more light effects based on an analysis of media content, said media content comprising video content and audio content, comprises allowing a user to influence a video weight and an audio weight used for a determination of one or more light effects, said video weight representing a weight of said video content in said determination of said one or more light effects and said audio weight representing a weight of said audio content in said determination, and obtaining information relating to said video content and/or information relating to said audio content. Said information related to said video content comprises color information extracted from said video content and said at least one processor is configured to determine colors from said color information by using a certain color extraction method. The color extraction method is selected based on at least said information related to said audio content if said video weight has a certain non-zero value and said audio weight has a certain non-zero value.

Said method further comprises determining said one or more light effects to be rendered on one more light sources while said media content is being rendered, said one or more light effects being determined based on said information relating to said video content in dependence on said video weight and being determined based on said information relating to said audio content in dependence on said audio weight, and storing a light script specifying said one or more light effects and/or controlling said one or more light sources to render said one or more light effects.

Said method may further comprise that a first color extraction method is selected if said information related to said audio content comprises a first energy value and a second color extraction method is selected if said information related to said audio content comprises a second energy value, said second energy value being higher than said first energy value and said second color extraction method involving a lower degree of smoothing than said first color extraction method, Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores a software code portion, the software code portion, when executed or processed by a computer, being configured to perform executable operations for determining one or more light effects based on an analysis of media content, said media content comprising video content and audio content.

The executable operations comprise allowing a user to influence a video weight and an audio weight used for a determination of one or more light effects, said video weight representing a weight of said video content in said determination of said one or more light effects and said audio weight representing a weight of said audio content in said determination, obtaining information relating to said video content and/or information relating to said audio content, determining said one or more light effects to be rendered on one more light sources while said media content is being rendered, said one or more light effects being determined based on said information relating to said video content in dependence on said video weight and being determined based on said information relating to said audio content in dependence on said audio weight, and storing a light script specifying said one or more light effects and/or controlling said one or more light sources to render said one or more light effects.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like, conventional procedural programming languages, such as the "C" programming language or similar programming languages, and functional programming languages such as Scala, Haskel or the like. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
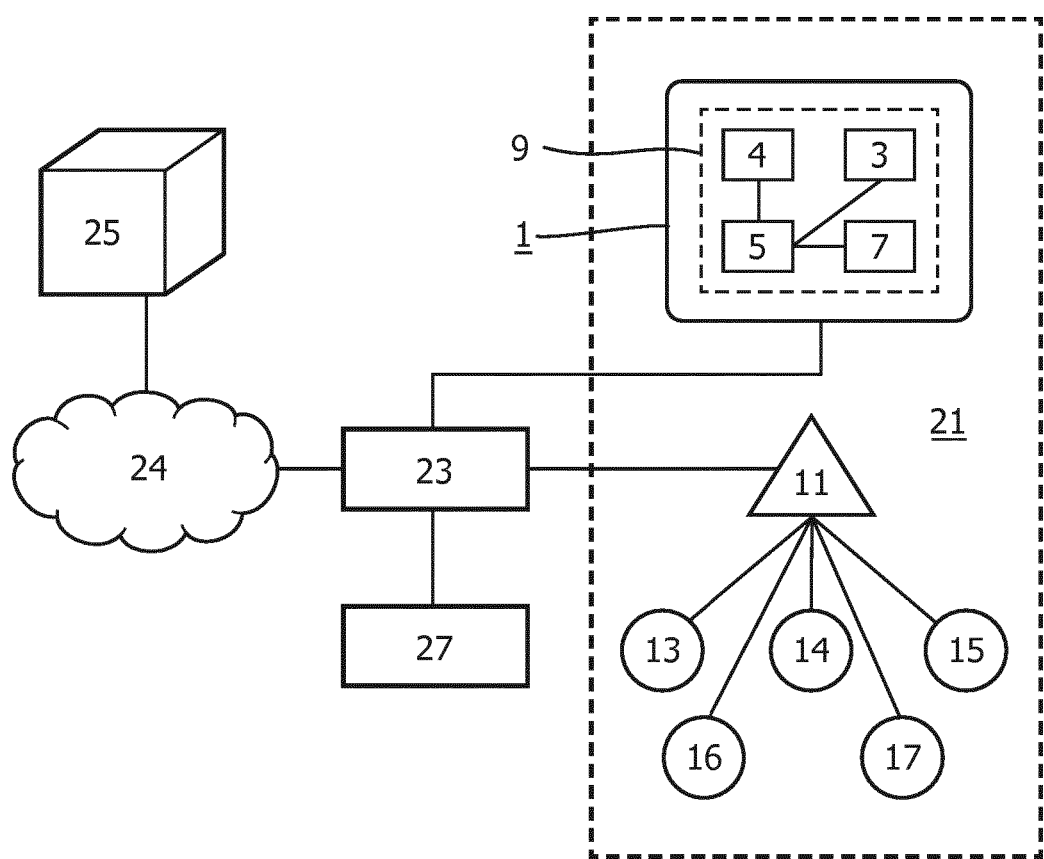
FIG. 1 is a block diagram of an embodiment of the system.

FIG. 1 shows an embodiment of the afore-mentioned system: mobile device 1. Mobile device 1 is connected to a wireless LAN access point 23. A bridge 11 is also connected to the wireless LAN access point 23, e.g. via Ethernet. Light sources 13-17 communicate wirelessly with the bridge 11, e.g. using the Zigbee protocol, and can be controlled via the bridge 11, e.g. by the mobile device 1. The bridge 11 may be a Philips Hue bridge and the light sources 13-17 may be Philips Hue lights, for example. In an alternative embodiment, light devices are controlled without a bridge.

A TV 27 is also connected to the wireless LAN access point 23. Media content may be rendered by the mobile device 1 or by the TV 27, for example. The wireless LAN access point 23 is connected to the Internet 24. An Internet server 25 is also connected to the Internet 24. The mobile device 1 may be a mobile phone or a tablet, for example. The mobile device 1 may run the Philips Hue Sync app, for example. The mobile device 1 comprises a processor 5, a receiver 3, a transmitter 4, a memory 7, and a display 9. In the embodiment of FIG. 1, the display 9 comprises a touchscreen. The mobile device 1, the bridge 11 and the light sources 13-17 are part of lighting system 21.

In the embodiment of FIG. 1, the processor 5 is configured to perform an offscreen color extraction method. The processor 5 is therefore configured to use the receiver 3 to obtain video content, perform an analysis on a plurality of frames of the video content, determine a camera movement in the plurality of frames based on the analysis, extract offscreen color information from at least one of the plurality of frames based on the determined camera movement, and determine one or more light effects to be rendered on one more light sources 13-17 while a further frame of the video content is being rendered. Color may comprise chromaticity and brightness, for example.

The further frame neighbors the plurality of frames and the one or more light effects are determined based on the offscreen color information. The processor 5 is further configured to use the transmitter 4 to control the one or more light sources 13-17 to render the one or more light effects and/or store a light script specifying the one or more light effects.

In the embodiment of FIG. 1, the processor 5 is further configured to perform a color extraction selection method. The processor 5 is therefore configured to use the receiver 3 to obtain media content and information about the media content. The media content comprises video content. The processor 5 is further configured to select a color extraction method from a plurality of color extraction methods based on the obtained information. The color extraction methods differ from each other in that they extract different colors from the same pixels.

The processor 5 is further configured to extract a color from one or more frames of the video content by applying the selected color extraction method and determine one or more light effects to be rendered on one more light sources while the one or more frames are being rendered. The colors may be extracted from onscreen content and/or offscreen content. The one or more light effects are determined based on the extracted color. The processor 5 is further configured to use the transmitter 4 to control the one or more light sources to render the one or more light effects and/or store a light script specifying the one or more light effects.

In the embodiment of FIG. 1, the processor 5 is further configured to perform a weighted influence light effect creation method. The processor 5 is therefore configured to use the touchscreen display 9 to allow a user to influence a video weight and an audio weight used for a determination of one or more light effects. The video weight represents a weight of the video content in the determination of the one or more light effects and the audio weight represents a weight of the audio content in the determination. The audio weight may be a music weight, i.e. only used to weigh how light effects are determined based on information relating to music content, or the audio weight may also be applied to other types of audio, e.g. speech and/or audio effects.

The processor 5 is further configured to use the receiver 3 to obtain information relating to the video content and/or information relating to the audio content and determine the one or more light effects to be rendered on one more light sources while the media content is being rendered. The one or more light effects are determined based on the information relating to the video content in dependence on the video weight and are determined based on the information relating to the audio content in dependence on the audio weight.

For example, a color extraction method may be selected based on the obtained information in dependence on the video weight and the audio weigh. The color extraction method may then be used to extract colors from onscreen content and/or offscreen content. The video weight may be used to indicate how colors extracted from the offscreen content and colors extracted from the onscreen content should be weighed. For example, if the user indicates a higher video weight or indicates a higher offscreen contribution as a component of the video weight, colors extracted from the offscreen content may be given a higher weight than they would otherwise be given.

The processor 5 is further configured to use the transmitter 4 to control the one or more light sources to render the one or more light effects and/or store a light script specifying the one or more light effects. In the embodiment of FIG. 1, the processor 5 is configured to perform all three methods. In an alternative embodiment, the processor 5 is configured to perform one or two of the three methods.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from Qualcomm or ARM-based, or an application-specific processor. The processor 5 of the mobile device 1 may run an Android or iOS operating system for example. The memory 7 may comprise one or more memory units. The memory 7 may comprise solid-state memory, for example. The memory 7 may be used to store an operating system, applications and application data, for example.

The receiver 3 and the transmitter 4 may use one or more wireless communication technologies such as Wi-Fi (IEEE 802.11) to communicate with the wireless LAN access point 23, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The display 9 may comprise an LCD or OLED panel, for example. The mobile device 1 may comprise other components typical for a mobile device such as a battery and a power connector. The invention may be implemented using a computer program running on one or more processors.

In the embodiment of FIG. 1, the system of the invention is a mobile device. In an alternative embodiment, the system of the invention is a different device, e.g. a PC or a video module, or comprises multiple devices. The video module may be a dedicated HDMI module that can be put between the TV and the device providing the HDMI input so that it can analyze the HDMI input, for example.

Figure 2:
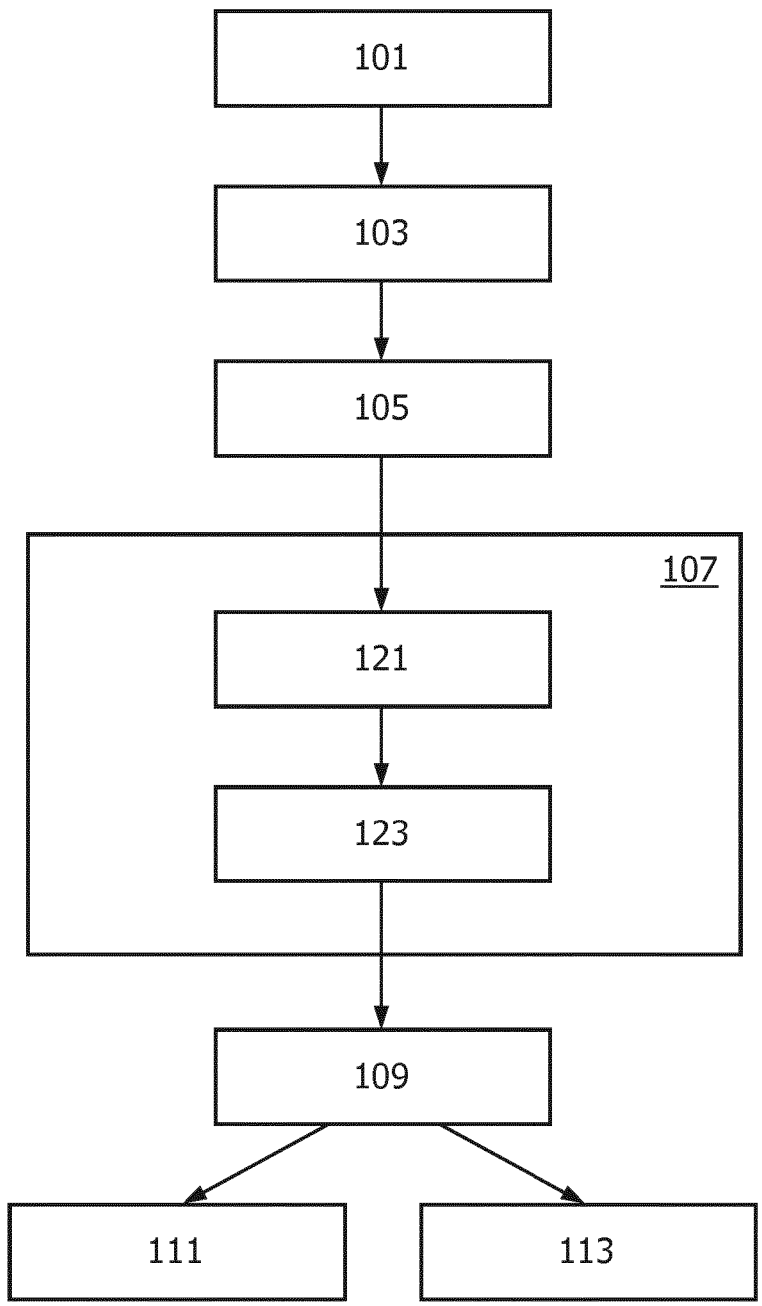
FIG. 2 is a flow diagram of a first embodiment of the offscreen color extraction method.

A first embodiment of the offscreen color extraction method is shown in FIG. 2. A step 101 comprises obtaining video content. A step 103 comprises performing an analysis on a plurality of frames of the video content. A step 105 comprises determining a camera movement in the plurality of frames based on the analysis. The camera movement may be a tilt, zoom, lateral camera movement or swiveling camera movement, for example. A step 107 comprises extracting offscreen color information from at least one of the plurality of frames based on the determined camera movement.

A step 109 comprises determining one or more light effects to be rendered on one more light sources while a further frame of the video content is being rendered. The further frame neighbors the plurality of frames and the one or more light effects are determined based on the offscreen color information. The plurality of frames comprises one or more frames preceding the frame and/or one or more frames following the frame. After step 109, a step 111 and/or a step 113 are performed. Step 111 comprises storing a light script specifying the one or more light effects. Step 113 comprises controlling the one or more light sources to render the one or more light effects.

For example, the following process may be used for creating a light script:
1. A pre-analysis of the visual media is performed (with or without human assistance) to obtain camera movement information about camera movements that happen in a continuous segment (a "shot") of video. A tracking process may be applied both forwards and in reverse to obtain a greater data set with which to work.
2. Each frame within the shot is virtually positioned in relation to the other frames in the shot, based on the information gathered in step 1.
3. For each frame, data is stored about the position of offscreen color information.

4. (optional) Manual editing is performed (for example choosing to use offscreen content or not for a given cut).
5. A final script is produced, where portions of the script contain off-screen color information.

For real time light effect rendering, it may be possible (given enough processing resources) to run all the above steps (apart from reverse-analysis) in real-time. However, it would normally not be possible to detect color information coming on to screen (i.e. part of future frames) unless the video output would be delayed for several frames using a buffer (which could be realized with the afore-mentioned video module).

In the embodiment of FIG. 2, step 107 comprises sub steps 121 and 123. Step 121 comprises selecting the at least one frame from the plurality of frames by selecting a frame based on a spatial position of a light source of the one or more light sources and the determined camera movement. Step 123 comprises determine an analysis area for extracting offscreen color information for the light source in the selected frame.

Thus, the virtual location of the off-screen content in respect to the viewer can be estimated and mapped based on the spatial location of the light source. For example, if the camera performs a 180-degree swiveling movement, the light effects rendered on the light sources behind the user might use the (color) information from the frame that corresponds to the start of the camera movement (reflecting 0 degrees of rotation). Although this example describes horizontal movement only, this principle may be used for horizontal movements and/or for vertical movements.

Figure 3:
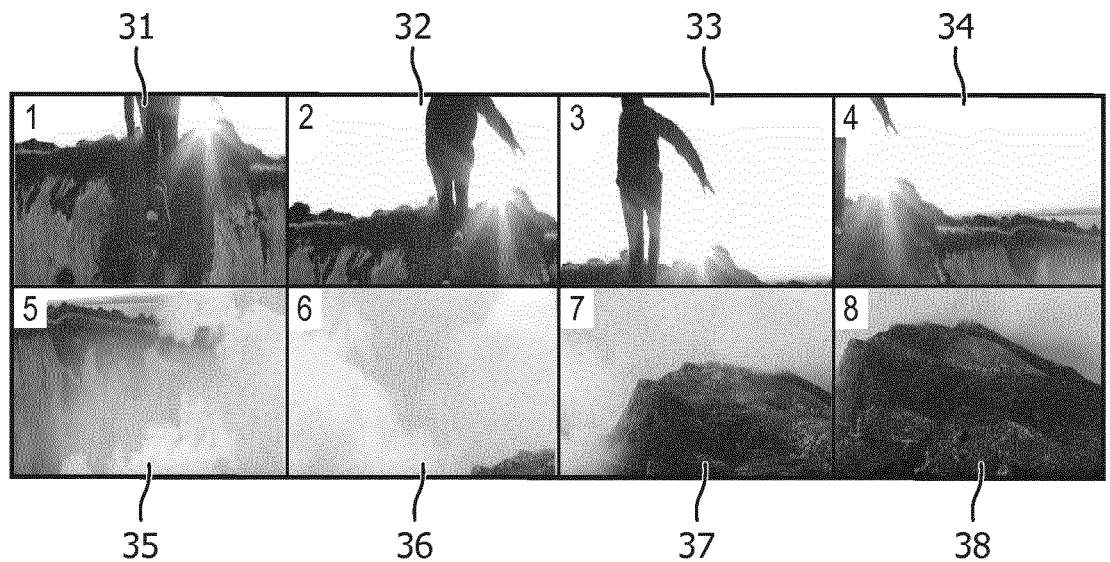
FIG. 3 shows examples of video frames of which some capture a bright light source.
Figure 4:
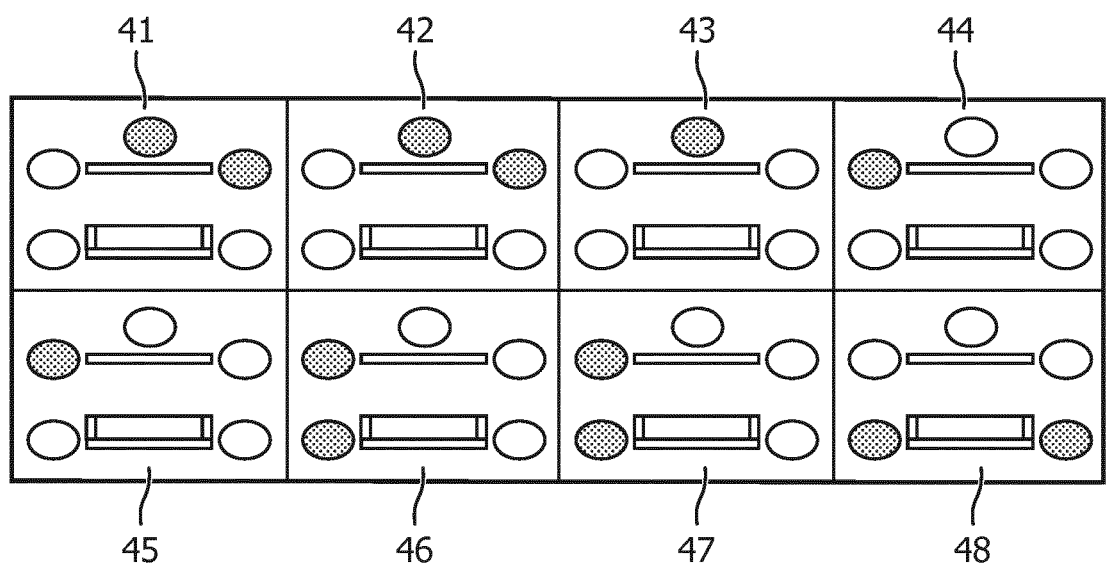
FIG. 4 shows examples of light settings reflecting the position of the bright light source for each of the video frames of FIG. 3.

FIG. 3 shows an example of consecutive video frames 31-38 captured when a camera performs such a 180-degree swiveling movement. Video frames 31-38 are part of a single shot. Frames 31-34 capture a bright light source, the sun, whose color is the dominant color in these frames. FIG. 4 shows examples of light settings at moments 41-48 for each of the video frames 31-38 of FIG. 3 and depicts how the light settings of the light sources follow the bright white of the sun.

The camera movement is determined to start in frame 31. The position of the sun in frame 31 results in the center and front-right light sources rendering light effects matching the bright white of the sun at moment 41. In frames 31-34, the sun is still visible onscreen. In frames 35-38, the sun is no longer visible onscreen, but is still represented in the light settings. For frame 38, it is determined that the camera has swiveled 180 degrees and that for light sources behind the viewer, color information should be extracted from frame 31. At moment 48, the back-left and back-right light sources will therefore render light effects matching the bright white of the sun.

Figure 5:
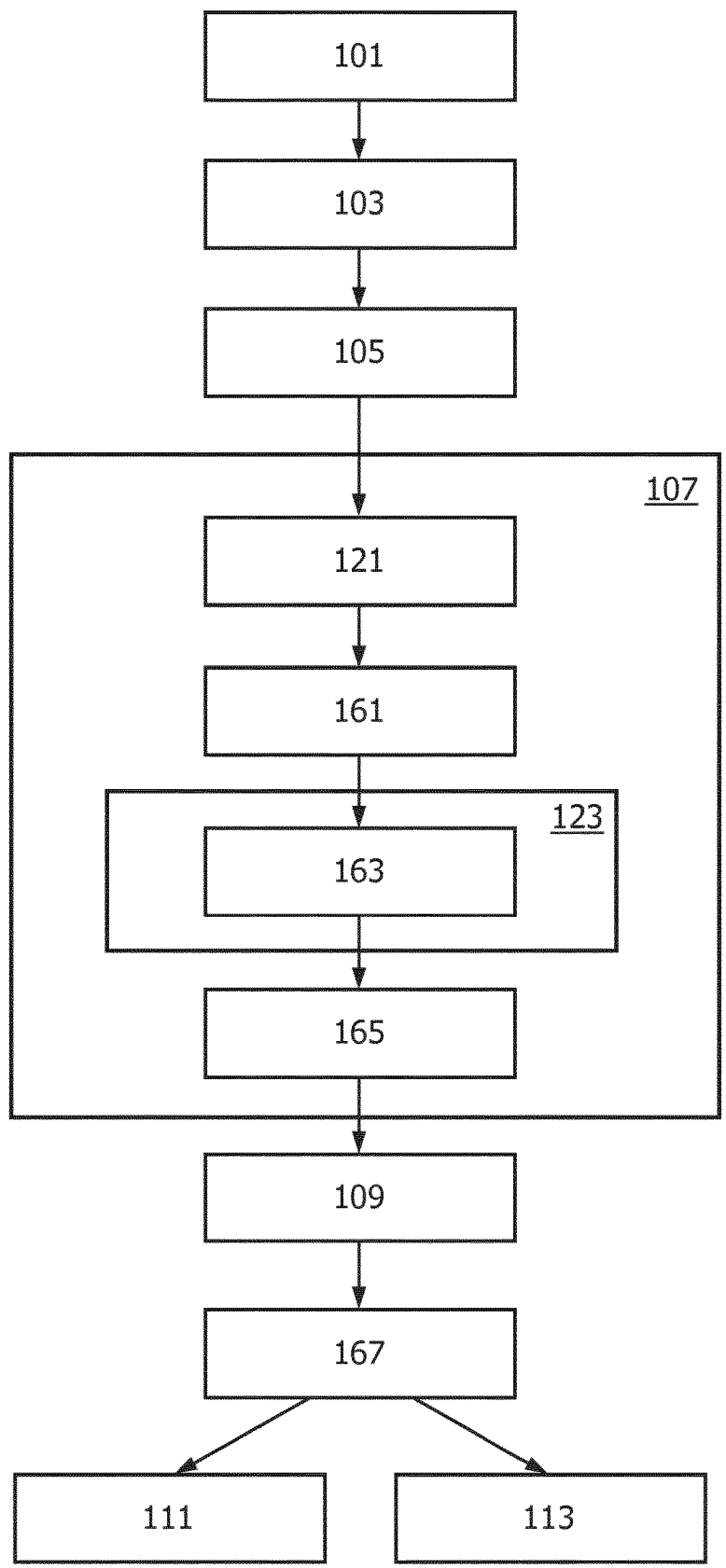
FIG. 5 is a flow diagram of a second embodiment of the offscreen color extraction method.

A second embodiment of the offscreen color extraction method is shown in FIG. 5. This second embodiment is an extension of the first embodiment of FIG. 2. In this second embodiment, the method comprises an additional step 167, step 107 comprises two additional sub steps, steps 161 and 165, and step 123 comprises a sub step 163. Step 161 comprises determining whether the at least one frame captures a moving object and step 163 comprises extracting the offscreen color information from one or more areas of the at least one frame which do not capture the moving object. Step 165 comprises further extracting onscreen color information from the further frame of the video content and step 167 comprises determining one or more further light effects based on the onscreen color information.

Figure 6:
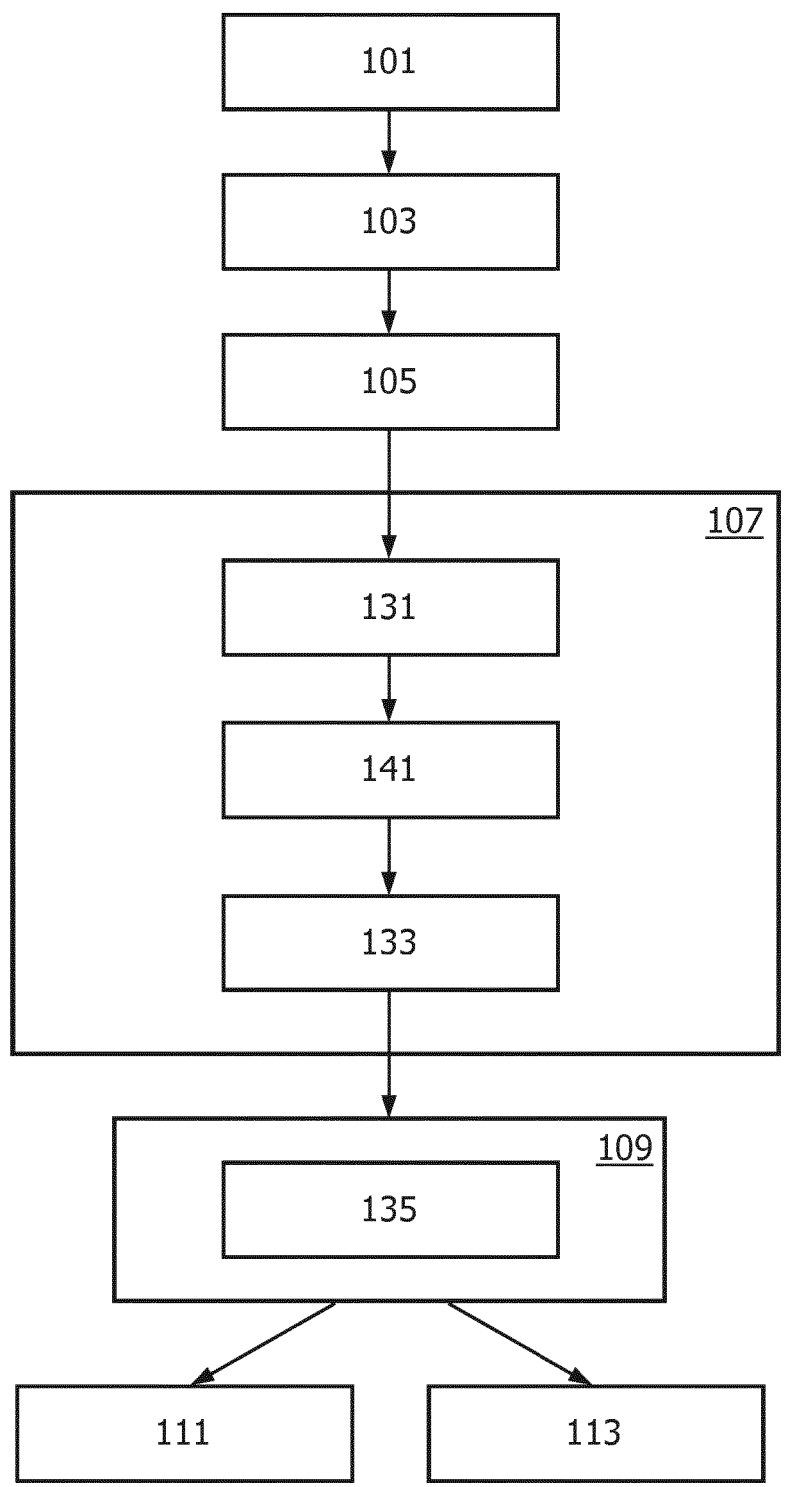
FIG. 6 is a flow diagram of a third embodiment of the offscreen color extraction method.

A third embodiment of the offscreen color extraction method is shown in FIG. 6. In the embodiment of FIG. 6, step 107 comprises sub steps 131, 141 and 133, instead of sub steps 121 and 123 of FIG. 2, and step 109 comprises a sub step 135. Step 131 comprises composing a super frame which comprises the further frame (i.e. the current frame) and part of the at least one frame. The super frame is composed based on the determined camera movement. Step 141 comprises determining an analysis area for extracting offscreen color information for a light source of the one or more light sources from the super frame based on a spatial position of the light source and information about the camera movement. Step 141 may be performed for a subset or for all of the one or more light sources.

The information about the camera movement may indicate whether the camera movement is a lateral camera movement or a swiveling camera movement, for example. Edge detection may be used, and/or a motion parallax may be determined, to distinguish between lateral camera movement and swiveling camera movement. Step 133 comprises determining onscreen color information and offscreen color information and from the super frame using the analysis area(s) determined in step 141. Step 135 comprises determining the one or more light effects based on the onscreen color information and the offscreen color information.

Figure 7:
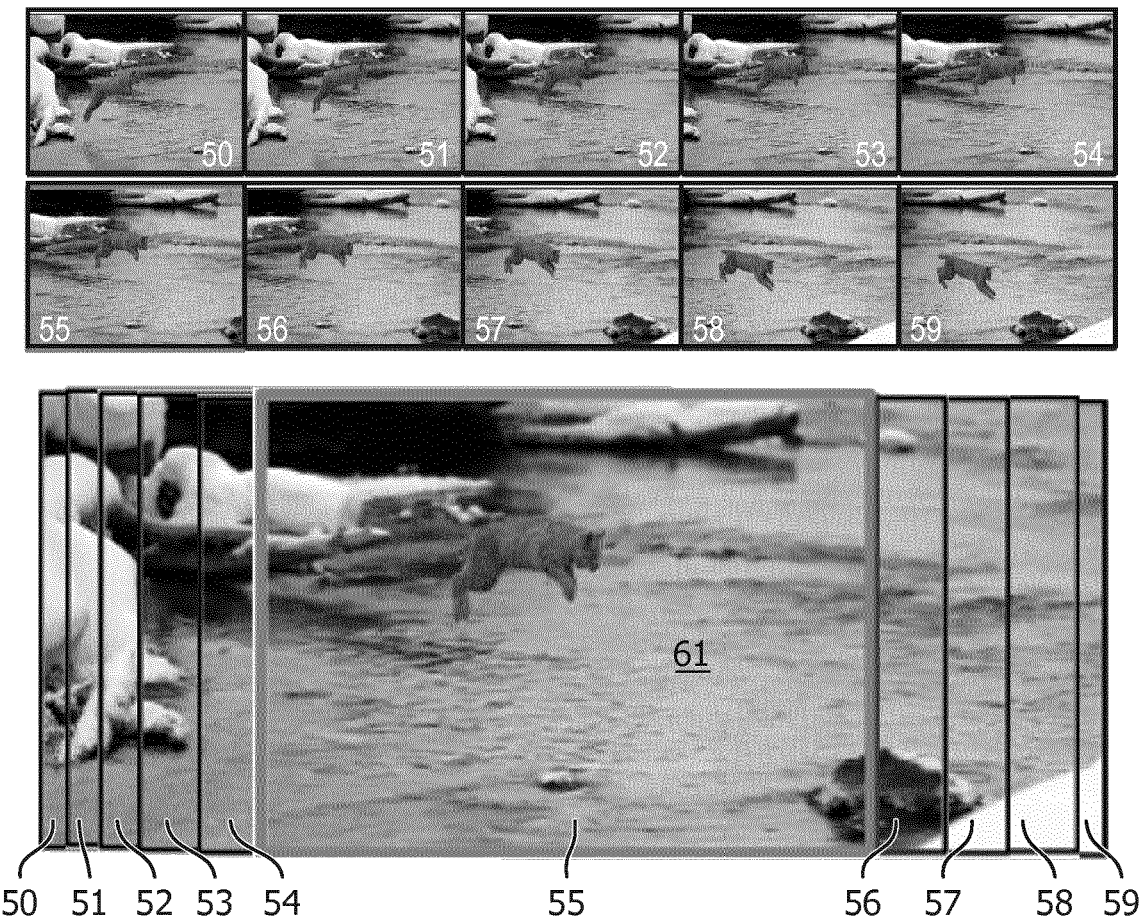
FIG. 7 shows an example of a super frame composed of the current frame and nine neighboring frames.

FIG. 7 shows an example of collaging frames resulting from a camera movement to extend the boundaries of the current frame, thereby creating a super frame. Parts of previous frames 50-54 and future frames 56-59 are included in a super frame 61 together with current frame 55. In the example of FIG. 7, first current frame 55 has been added to the super frame 61. Next, the parts of frame 54 and frame 56 that are not also part of frames 55 have been added to the super frame 61. Next, the parts of frame 53 and frame 57 that are not already part of the super frame 61 are added to super frame 61. The same principle has been used for frames 50-52 and 58-59.

Figure 8:
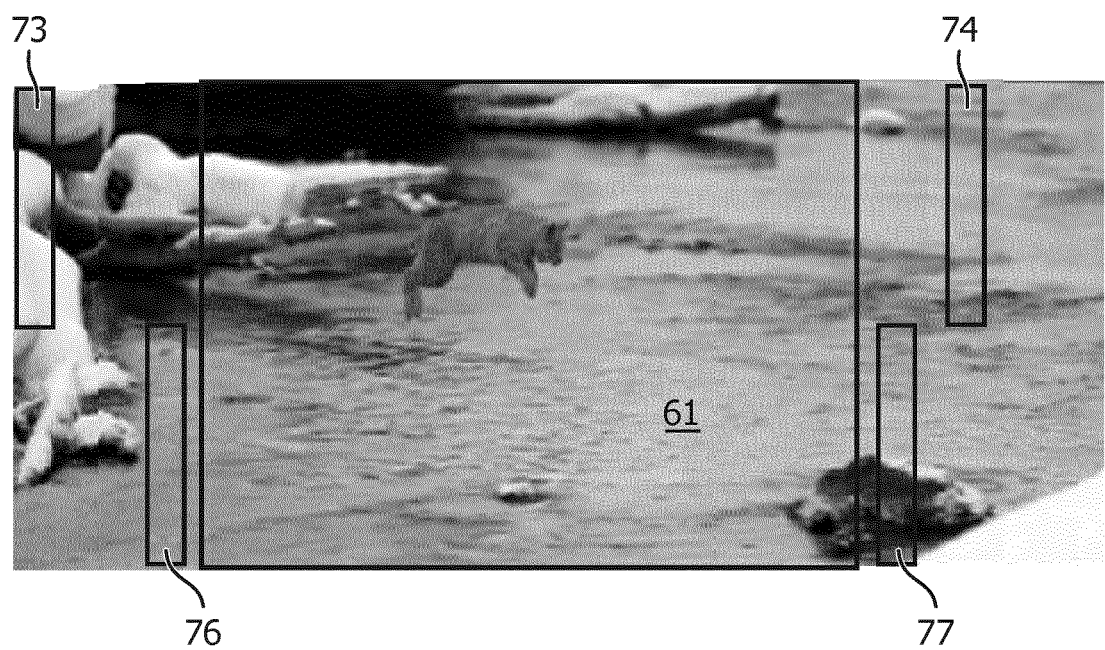
FIG. 8 depicts examples of analysis areas in the super frame of FIG. 7.

FIG. 8 illustrates that the offscreen content of the super frame 61 may be used to render different portions of the offscreen content on the light sources, depending on the spatial position of the light sources (e.g. as specified in the user's lighting setup information) in relation to the user's screen. Analysis areas 73 and 74 may be used for a first user who has light sources positioned higher and farther from the screen and analysis areas 76 and 77 may be used for a second user who has light sources positioned lower and closer to the screen. Analysis area 73 is located in the part obtained from frame 51 of FIG. 7, analysis area 74 is located in the part obtained from frame 57 of FIG. 7, analysis area 76 is located in the part obtained from frame 54 of FIG. 7, analysis area 77 is located in the part obtained from frame 56 of FIG. 7.

In the example of FIG. 8, analysis areas are only determined from offscreen content, but analysis areas might also be determined from onscreen content. The light sources to which the analysis areas are mapped may all be part of different light devices, or one or more light devices may comprise multiple of the light sources, e.g. may use pixelated light. In case of pixelated light, one part of it may render a light effect created based on the onscreen content while another part of it may render a light effect created based on the offscreen content. Thus, a pixelated light strip might be able to render light effects created based on the whole super frame 61 of FIG. 8.

Figure 9:
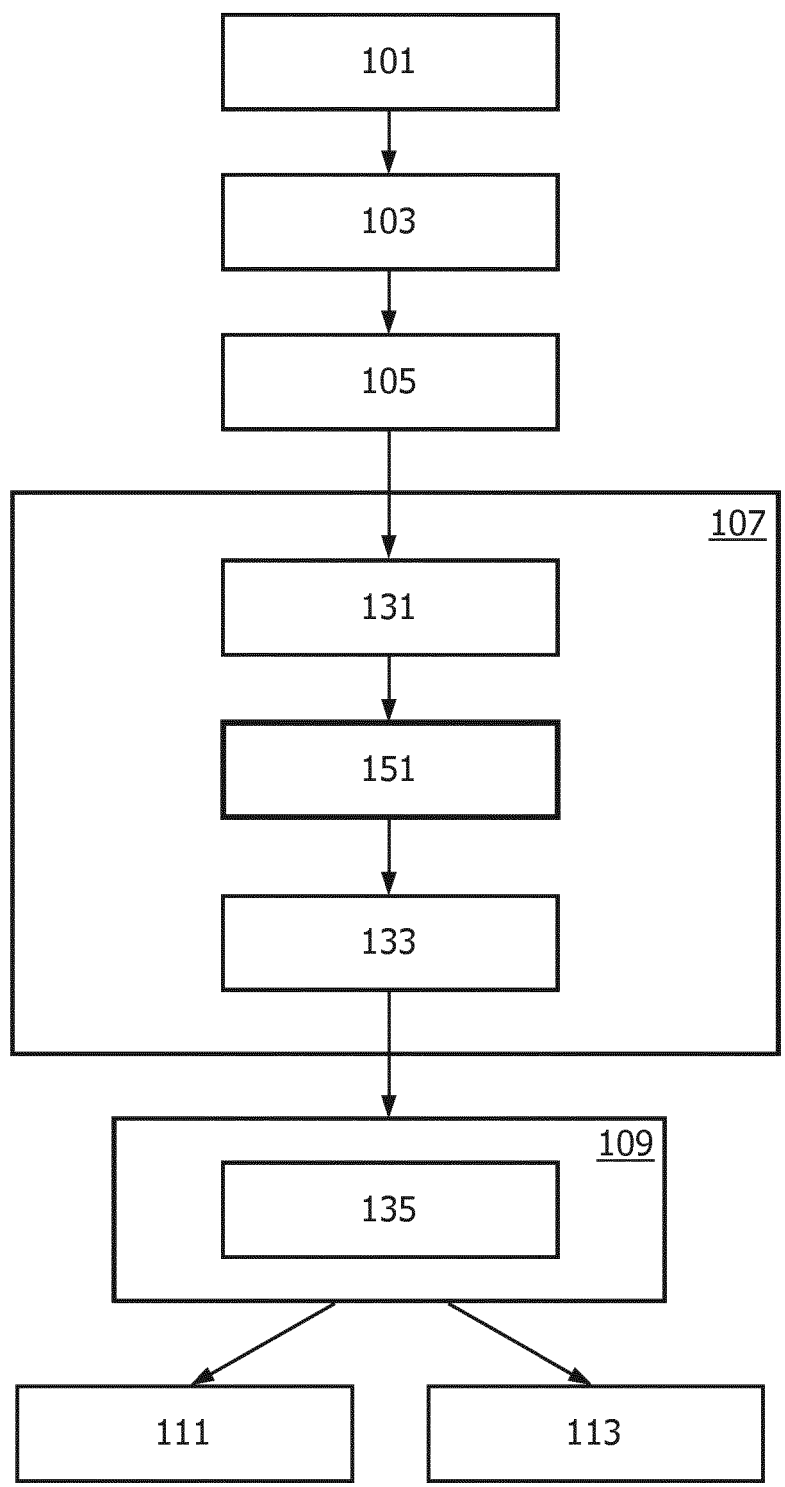
FIG. 9 is a flow diagram of a fourth embodiment of the offscreen color extraction method.

A fourth embodiment of the offscreen color extraction method is shown in FIG. 9. In the fourth embodiment, step 141 of the third embodiment of FIG. 6 has been replaced with a step 151. Step 151 comprises determining a single analysis area for extracting both the onscreen color information and the offscreen color information. The position and/or the size of the single analysis area is determined such that a part of the analysis area overlaps with the further frame (i.e. the current/onscreen frame) and a part of the analysis area overlaps with the part of the at least one frame (from which the offscreen color information is extracted).

Figure 10:
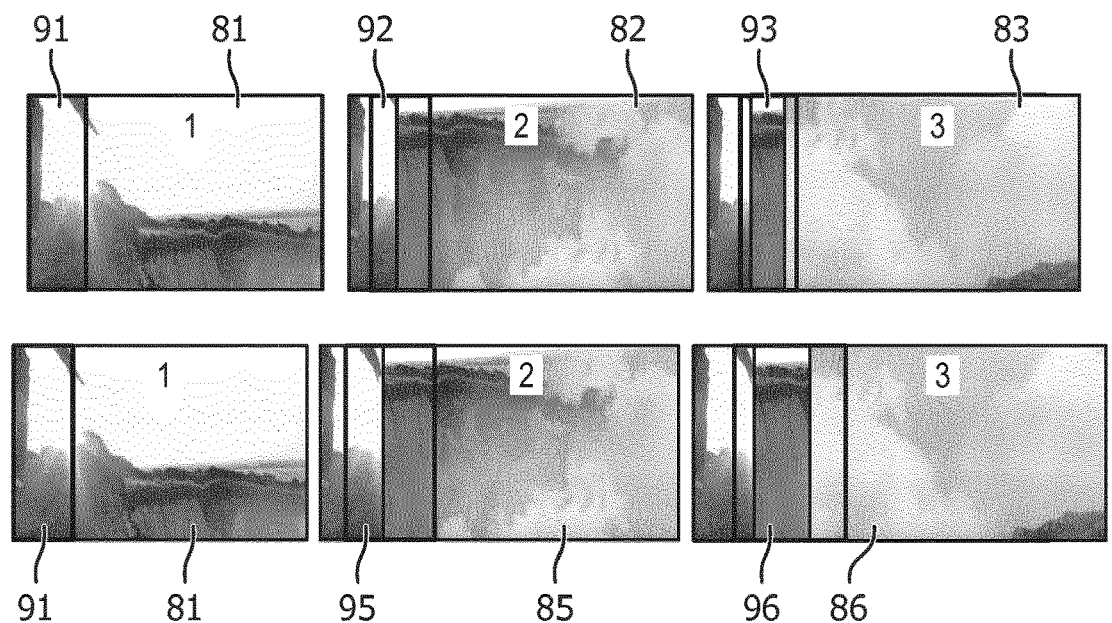
FIG. 10 shows examples of different analysis areas in a super frame.

This is illustrated with the help of FIG. 10. In frames 81-83, it is shown that the analysis area may be moved to cover both onscreen content and offscreen content in a super frame. Frame 81 reflects the start of the camera movement and analysis area 91 is at its normal position. Super frames 82 and 83 comprise parts of multiple previous frames. In super frame 82, the analysis area 92 is moved to the right to cover both a part of the current frame and a part of one previous frame. The analysis area 93 has been moved so that it overlaps with the current frame and two previous frames.

In frames 85-86, the analysis area is not only moved, but also stretched. How much the area "stretches" may be defined by the script creator or automatically. Compared to analysis area 92, analysis area 95 has been enlarged to cover a larger part of the two frames. Compared to analysis area 93, analysis area 96 has been enlarged to cover a larger part of the three frames. Frames 85-86 are the same as frames 82-83, except that the analysis areas are different.

When extracting both offscreen and onscreen color information in order to create a light effect based on both, different weights may be assigned to the color values for the on screen versus off screen areas to, for example, reduce or increase the impact of the offscreen color information. For example, an algorithm may be used that gives a weight of one to colors extracted from pixels in the onscreen area and gives a reduced weight to colors extracted from pixels in the offscreen area, wherein the weight becomes lower the farther away the pixels are from the onscreen area.

Figure 23:
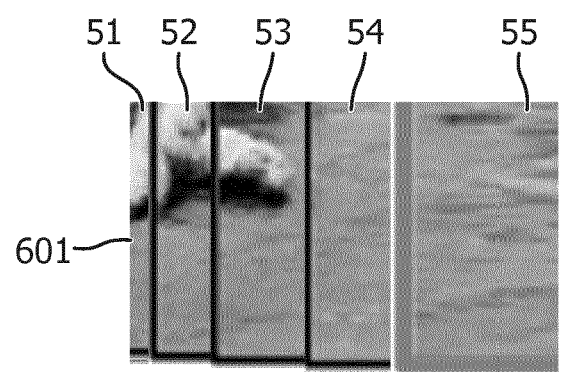
FIG. 23 depicts an example of a function which assigns weights to pixels of a super frame for determining a single color from these pixels.
Figure 23:
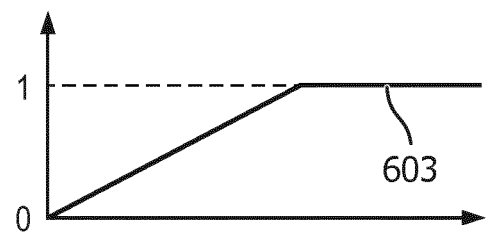

This algorithm may be implemented by a discrete function or a continuous (e.g. linear) function, for example. An example of the latter is depicted in FIG. 23. FIG. 23 shows a portion 601 of the super frame 61 of FIG. 7. The portion 601 is composed of parts of the current frame 55 and parts of the previous frames 51 to 54. A weight (ranging from 0 to 1) to be given to colors extracted from a certain column of pixels in portion 601 can be determined from a corresponding portion of the line 603 below the column of pixels. In FIG. 23, only a part of super frame 61 is shown. The same principle may be applied to other pixels of super frame 61. A user may be able to specify which weighting is applied.

Figure 11:
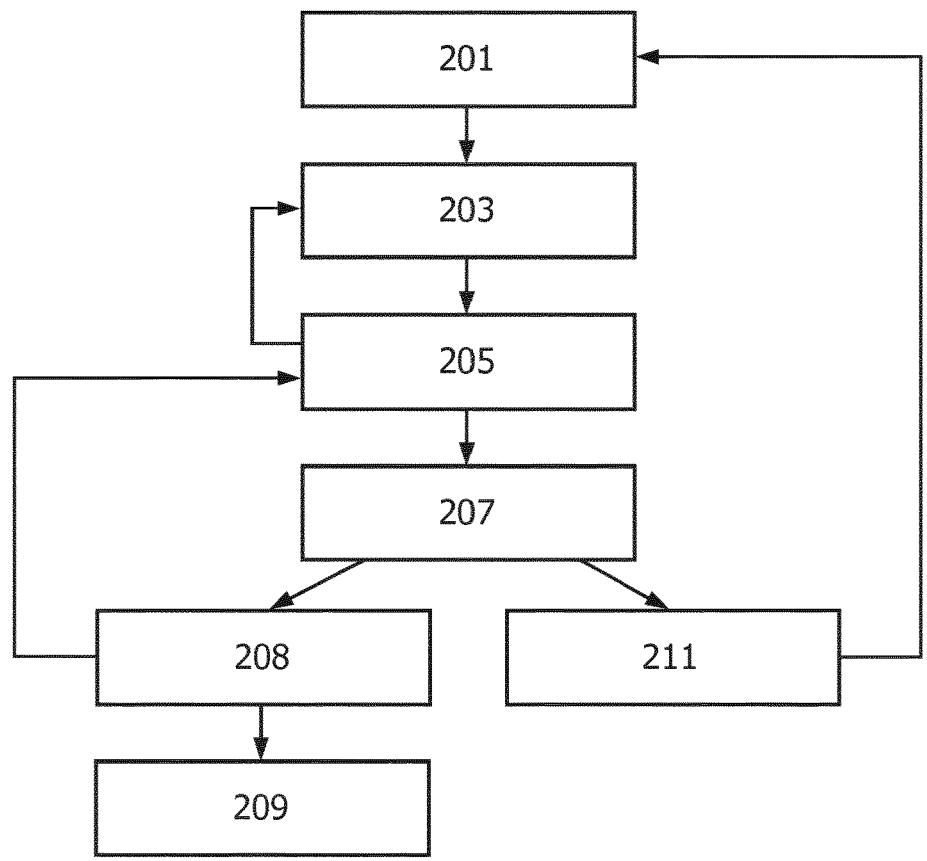
FIG. 11 is a flow diagram of a first embodiment of the color extraction selection method.

A first embodiment of the color extraction selection method is shown in FIG. 11. A step 201 comprises obtaining media content and information about the media content. The media content comprises video content and may further comprise audio content. The information about the content may comprise a level of dynamicity, contrast information, saturation information, an audio level, a genre, a scene location, a scene type, and/or a song title, for example.

A step 203 comprises selecting a color extraction method from a plurality of color extraction methods based on the obtained information. The color extraction methods differ from each other in that they extract different colors from the same pixels. The plurality of color extraction methods may comprise different types of color extraction methods and/or different sets of parameters for a single type of color extraction method, for example.

The different types of color extraction methods may comprise average color determination (e.g. trimean color determination, mean color determination, median color determination, or mode color determination), dominant color determination, dominant illumination color determination, visible light source color determination, and/or feature color determination, for example. An average color may be determined per frame (subarea) and the averages over multiple frames may then themselves be averaged (e.g. a trimean of trimeans). A different averaging method may be used to determine the average per frame (subarea) than to determine the average of averages.

Different methods of performing color extraction may use different weights for different areas of color space, e.g. based on mood. For example, if a mood is determined to be depressing, a color extraction method may be used that gives a higher weight to (i.e. prefers) desaturated colors. Different methods of performing trimean determination (or other average color determination) may further use different weights for different analysis areas of the frame, e.g. a trimean determined from an analysis area (e.g. one or more columns of pixels) in the offscreen content of a super frame may be given a different weight than a trimean determined from an analysis area in the onscreen content of the super frame, after which an average (e.g. trimean) of the trimeans of the different analysis areas may be determined.

A step 205 comprises extracting a color from one or more frames of the video content by applying the selected color extraction method. In the embodiment of FIG. 11, one or more colors are extracted per section for a plurality of sections. Each section comprises a scene, a shot or a single frame. The scene and the shot comprise a plurality of frames. A single color may be extracted per section from all frames of the section and/or a color may be extracted per section per subarea from the subarea in all frames of the section. In the embodiment of FIG. 11, if a light script is to be stored, then step 203 may be repeated after step 205, but then for a different section.

A different color extraction method may be selected for different subareas (i.e. different areas of the screen) of a section, e.g. depending on the type of content and types of light sources in the user's lighting setup. For example, trimean determination may be used on the center of the screen for the light sources mapped to the center area of the screen and dominant color determination may be used on the left and right of the screen for the light sources mapped to the left and right areas of the screen. Thus, a plurality of different color extraction methods may be selected for a certain section to extract colors from a plurality of different subareas of said section.

If colors are extracted from different subareas, multiple candidate colors may be extracted from one or more of the subareas using the selected color extract method(s) and one color may be selected from the candidate colors per subarea so that the different colors extracted from the different subareas are aesthetically pleasing, complementary, identical in hue, or identical in brightness, for example. For instance, depending on the preset (e.g. pleasing or complementary), different color combinations may be rendered e.g. on the flanking lamps. As a first example, multiple candidate colors may be extracted by determining the three most dominant colors in a subarea. As a second example, multiple candidate colors may be extracted by using different methods of average color determination (e.g. trimean, mean, median and mode).

A step 207 comprises determining one or more light effects to be rendered on one more light sources while the one or more frames are being rendered. The one or more light effects are determined based on the extracted color. After step 207, a step 209 and/or a step 211 are performed.

Step 209 comprises storing a light script specifying the one or more light effects. In the embodiment of FIG. 11, a step 208 is performed before step 209. Step 208 comprises allowing a user to confirm the extracted color and/or the selected color extraction method before storing the light script. In this embodiment, the user is allowed to modify the extracted colors manually or manually select a different color extraction method in step 208 if the selected colors and/or the selected color extraction method(s) are not to his liking. If the user selects a different color extraction method for a certain section or for all sections, step 205 is repeated for these sections.

Step 211 comprises controlling the one or more light sources to render the one or more light effects. In the embodiment of FIG. 11, after the one or more light effects have been determined and rendered for a certain section, step 201 is repeated, but for the next section of content. If a light script is created in step 209 in real-time at the same time as the one or more light sources are controlled in step 211, the light effects are determined and stored in the light script per section and step 208 is omitted.

For example, the following process may be used for creating a light script:
1. Information is gathered using one or more of the following example methods:
A pre-analysis of the audio-visual media (amount of visual dynamic, contrast, saturation, audio level, etc.)
Querying databases for existing information about the media content (genre, scene location and type, music titles, etc.)
2. Relevant information is then processed to determine the best color extraction method(s) to use for the content. In the ideal embodiment, the methods are defined on a section-by-section basis (for example by scenes, camera cuts, frames or a combination).
3. The extraction method is then confirmed for each media section, and "baked" into the final light script. Here the term "extraction method" simply refers to the creation of a color/intensity signal, based on the content. This does not imply that the resulting signal is in fact contained in the source. There may be a correlation, but the resulting chromaticity coordinates need not per definition be included in the source.

For real time light effect rendering, the following process may be used, for example:
1. Information is gathered using one or more of the following example methods:
Extraction from meta data provided by content provider, or querying databases (e.g. Gracenote) for existing information about the media content (genre, scene location and type, music titles, etc.)
Real-time analysis of streaming data (amount of dynamic, loudness, saturation etc.)
2. Relevant information is processed in real-time to determine the best color extraction method(s) to use for the current position in the media content.
3. Extraction is applied in real-time and rendered on the lighting sources.
Optionally, a buffer is used to buffer a couple of future frames, e.g. in a video module, to allow these future frames to be analyzed during real time light effect rendering.

Figure 12:
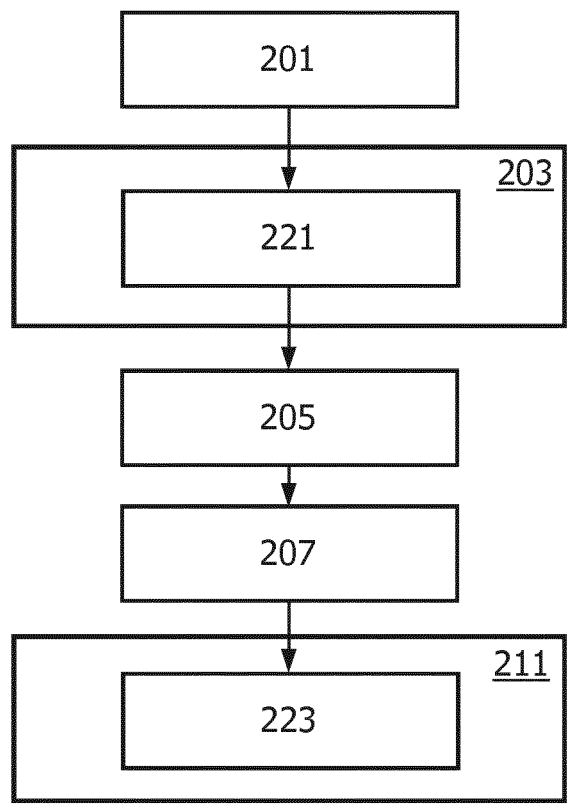
FIG. 12 is a flow diagram of a second embodiment of the color extraction selection method.

A second embodiment of the color extraction selection method is shown in FIG. 12. Compared to the first embodiment of FIG. 11, the second embodiment does not comprise steps 208 and 209. In this embodiment, only a light script is stored. Furthermore, in the second embodiment of FIG. 12, steps 203 and 211 of FIG. 11 comprise steps 221 and 223, respectively. Step 221 comprises selecting a color extraction method from a plurality of color extraction methods based on the obtained information and based on information about a user's lighting setup. The user's lighting setup comprises the one or more light sources. Step 223 comprises controlling the one or more light sources of the user's lighting setup to render the one or more light effects.

The information about the user's lighting setup may include quantity of light sources, spatial location of the light sources, types of light sources, capabilities of light sources, for example. For instance, if a user's lighting setup includes light sources that are capable of deep diming (e.g. Philips HueGo), a color extraction method may be selected that extracts different colors from dark scenes than a color extraction method selected if the user's lighting setup does not include any light sources with deep diming (e.g. a Philips Hue bulb E27).

Figure 13:
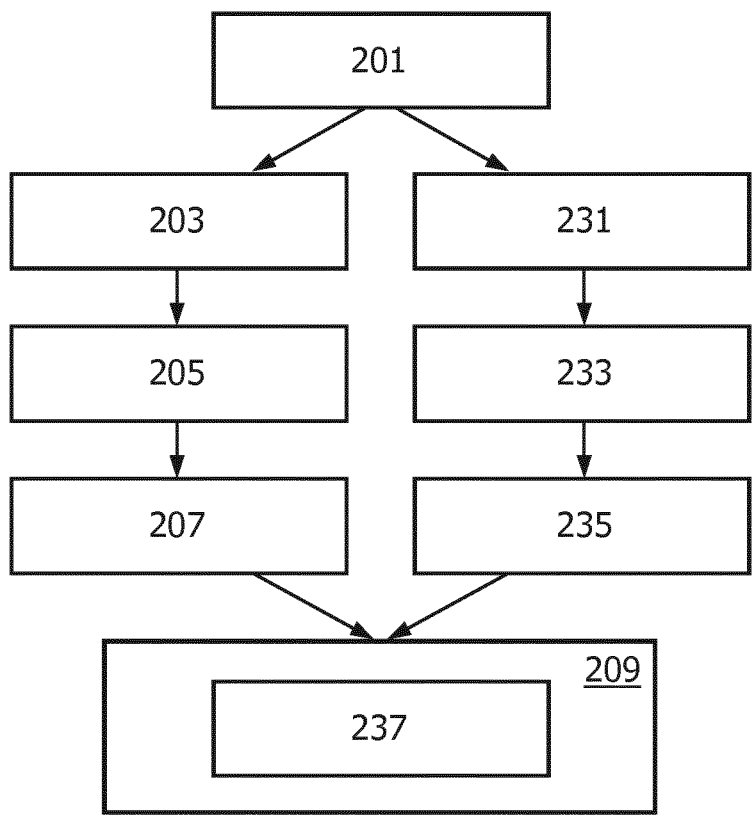
FIG. 13 is a flow diagram of a third embodiment of the color extraction selection method.

A third embodiment of the color extraction selection method is shown in FIG. 13. In step 207 of this embodiment, one or more light effects are determined for a first type of potential lighting setup. The method further comprises three additional steps. Step 231 comprises selecting a further color extraction method from the plurality of color extraction methods based on the obtained information. Step 233 comprises extracting a further color from the one or more frames of the video content by applying the further selected color extraction method.

Step 235 comprises determining one or more further light effects for a second type of potential lighting setup. The one or more further light effects are determined based on the extracted further color. Furthermore, step 209 comprises a step 237. Step 237 comprises specifying the one or more further light effects in the light script. The one or more light effects are associated with the first type of lighting setup in the light script and the one or more further light effects being associated with the second type of lighting setup in the light script. When the light script is later rendered, the matching light effects may be selected based on the user's actual lighting setup. In an alternative embodiment, the same approach is used for more than two potential lighting setups.

Thus, with the embodiments of FIGS. 12 and 13, the user's lighting setup can also be used to determine or select a type of color extraction method. In the case of scripted content, the script might include color palettes created using different methods and one of these palettes is then chosen during the playback based on the user's setup. In the case of the real-time light effect rendering, the user's setup could become a weighted factor (in addition to e.g. streaming data and content data) to decide what color extraction method to use. Information on the user's setup may include types of light sources, location of light sources and/or number of light sources, for example.

Figure 14:
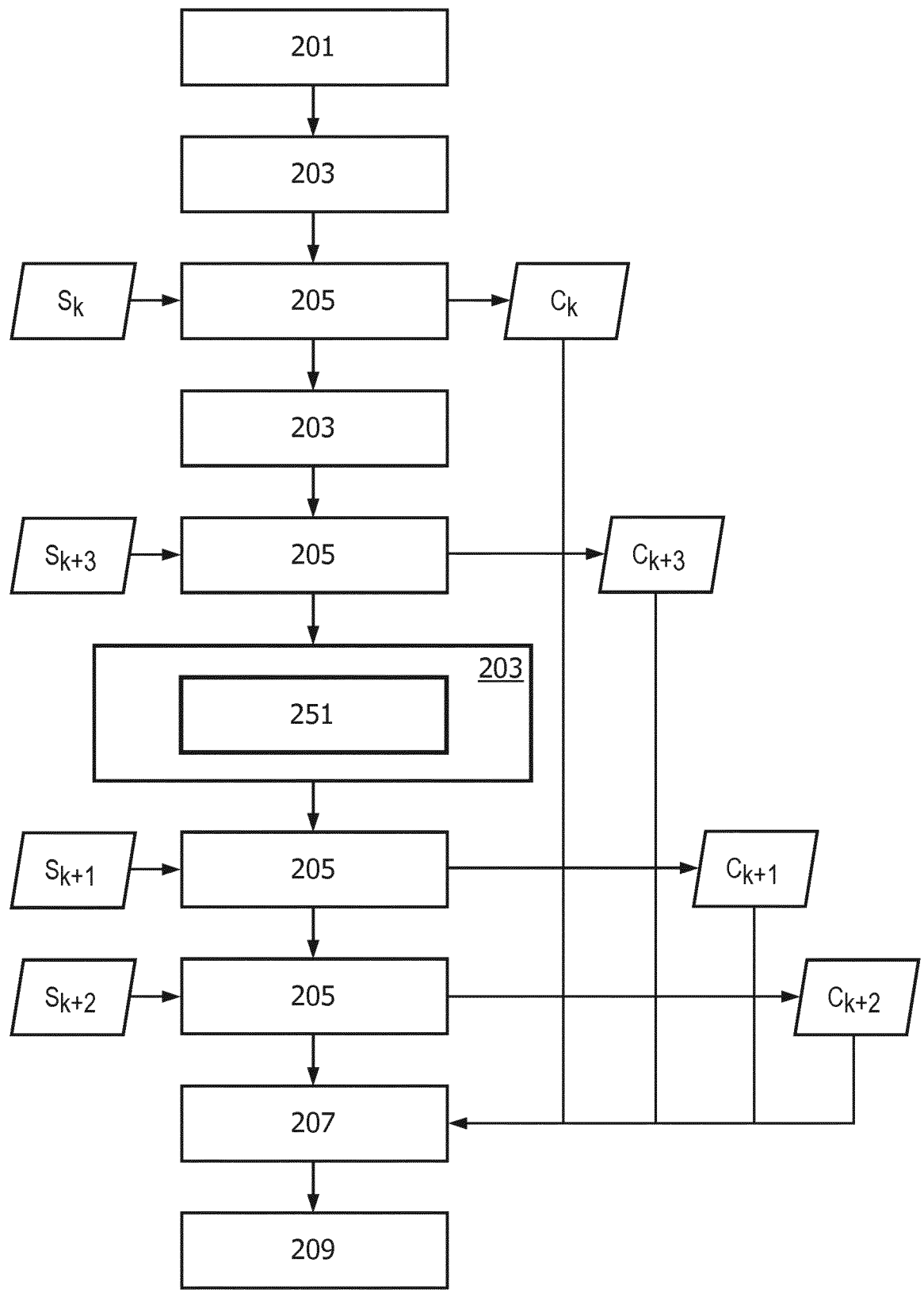
FIG. 14 is a flow diagram of a fourth embodiment of the color extraction selection method.

A fourth embodiment of the color extraction selection method is shown in FIG. 14. In this fourth embodiment, the plurality of color extraction methods comprises different sets of parameters for a single type of color extraction method and these different sets of parameters identify different areas of a color space used in a same type of color extraction method (e.g. trimean determination or another average color determination). Thus, how color transitions occur may be determined based on the obtained information. Instead of a direct line through a particular color space from e.g. point X to point Y, this path may be influenced by the obtained information. An example hereof would be color transitions that keep perceived lightness or saturation constant.

In step 201 of FIG. 14, four sections $S_k$-$S_{k+3}$ are obtained, e.g. four shots in the same scene. In the first iteration of step 203, the section $S_k$ is analyzed and a color extraction method is selected based on this analysis. This extraction method is applied to section $S_k$ in the first iteration of step 205 to determine color $C_k$. In the second iteration of step 203, the section $S_{k+3}$ is analyzed and a color extraction method is selected based on this analysis. This extraction method is applied to section $S_{k+3}$ in the second iteration of step 205 to determine color $C_{k+3}$.

Next step 251 comprises selecting a transition path in color space between the two colors $C_k$ and $C_{k+3}$ and selecting a color extraction method to be applied to the intermediate sections $S_{k+1}$ and $S_{k+2}$ located between the two sections $S_k$ and $S_{k+3}$. The color extraction method is selected based on the selected transition path. This extraction method is applied to section $S_{k+1}$ in the third iteration of step 205 to determine color $C_{k+1}$ and applied to section $S_{k+2}$ in the fourth iteration of step 205 to determine color $C_{k+2}$.

In step 207, the light effects to be rendered for sections $S_k$ to $S_{k+3}$ are determined based on the two colors $C_k$ and $C_{k+3}$ extracted from the two sections $S_k$ and $S_{k+3}$ and the colors $C_{k+1}$ and $C_{k+2}$ extracted from the intermediate sections $S_{k+1}$ and $S_{k+2}$. For example, a light effect for section $S_k$ is determined based on the color $C_k$, a light effect for section $S_{k+1}$ is determined based on the color $C_{k+1}$, a light effect for section $S_{k+2}$ is determined based on the color $C_{k+2}$, and a light effect for section $S_{k+3}$ is determined based on the color $C_{k+3}$. Step 209 comprises storing a light script specifying the light effects.

Figure 15:
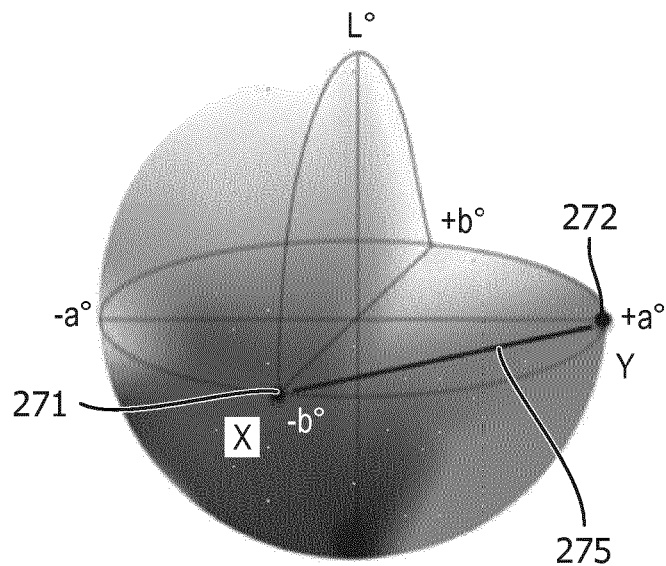
FIG. 15 shows an example of shortest distance color transitions in color space.
Figure 16:
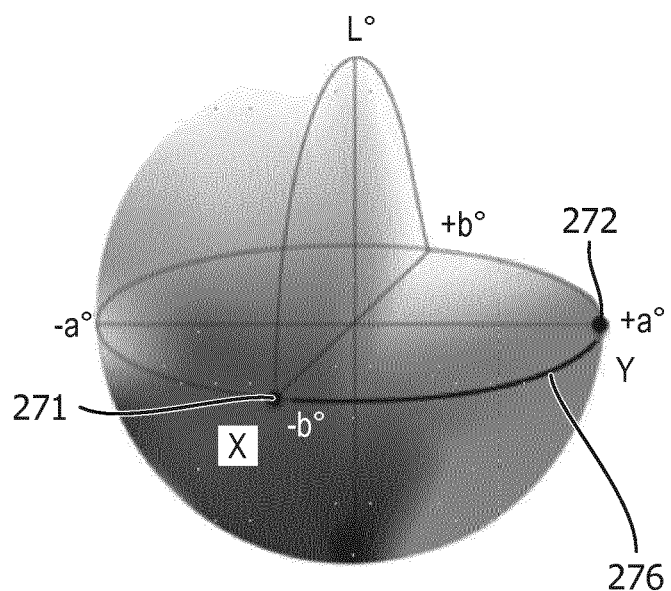
FIG. 16 shows an example of equal saturation color transitions in color space.
Figure 17:
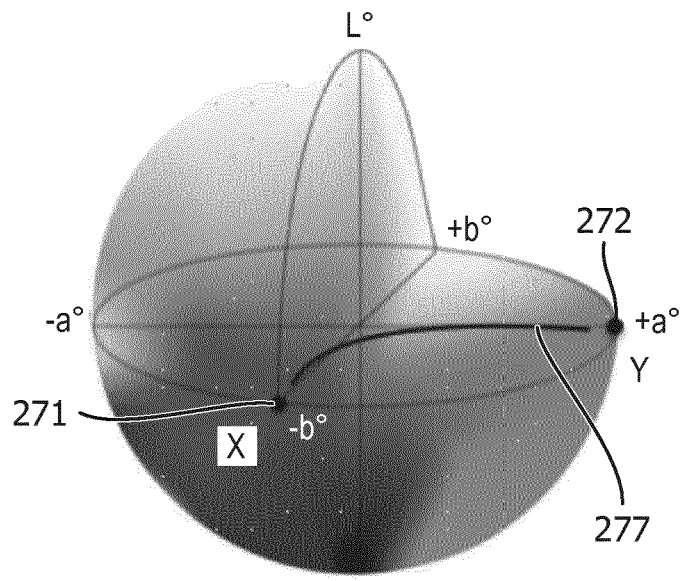
FIG. 17 shows an example of desaturation shortest distance color transitions in color space.

FIGS. 15-17 show examples of different color transition paths. FIGS. 15-17 represent CIEL*a*b* 1976 color space, and various paths to travel through the space from point X (coordinate 271) to point Y (coordinate 272). Coordinate 271 may correspond to $C_k$ and coordinate 272 may correspond to $C_{k+3}$, for example. For ease of explanation, L (Lightness) is constant for both X and Y and only a* and b* (green-red and blue-yellow color components) are variable. The Lightness of the extracted colors is expected to be either the same or different and the paths through color space can further comprise paths that are not a straight line between the lightness of X and Y. As an example, the lightness path between X and Y can be a parabola in such a way that some of the points on the path have Lightness lower than both X and Y. FIG. 15 shows a direct line of travel, a result hereof is that all points on this line, line 275, will be less saturated than points X and Y.

FIG. 16 shows a max saturation algorithm, that maximizes saturation during transition (all points on the line 276 are equal distance from origin. Finally, FIG. 17 shows an algorithm that desaturates the chromaticity coordinates on line 277 during transition. If it is determined based on the colors $C_k$ and $C_{k+3}$ that the mood of the scene is depressing, then the transition path depicted in FIG. 17 may be selected for the intermediate sections $S_{k+1}$ and $S_{k+2}$, for example.

Figure 18:
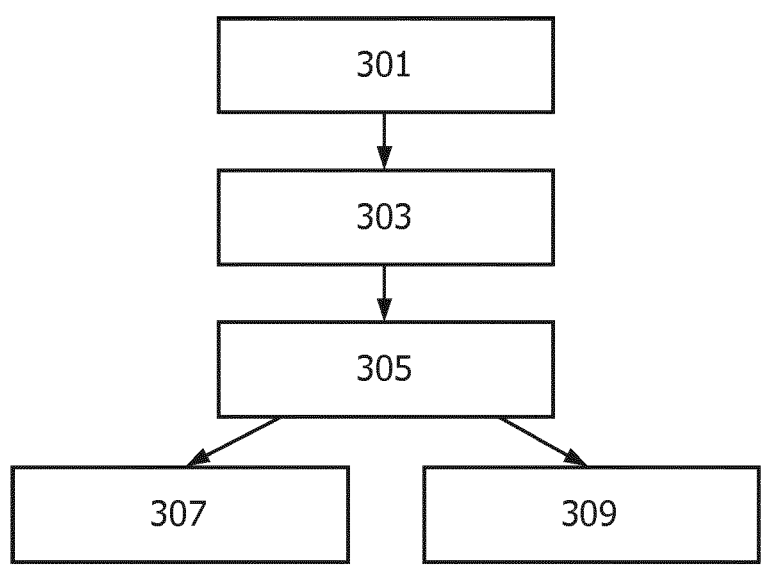
FIG. 18 is a flow diagram of a first embodiment of the weighted influence light effect creation method.

A first embodiment of the weighted influence light effect creation method is shown in FIG. 18. With the weighted influence light effect creation method, one or more light effects are determined based on an analysis of media content. The media content comprises video content and audio content. A step 301 comprises allowing a user to influence a video weight and an audio weight used for a determination of one or more light effects. The video weight represents a weight of the video content in the determination of the one or more light effects and the audio weight representing a weight of the audio content in this determination. The video weight may comprise a plurality of weight components for different types of video information and/or the audio weight may comprise a plurality of weight components for different types of audio information, e.g. a specific weight for music rhythm.

The user may be able to specify and/or to adapt both the video weight and the audio weight or the user may be able to specify and/or to adapt one of the two weights. In the latter case, after the user has specified or adapted the first weight, the second weight may be determined automatically based on the first weight. The user may specify a single value or a plurality of values, e.g. a range, for a weight. If the user specifies a plurality of values, the system itself may choose one of these values, e.g. depending on the type of audio content, on what channel(s) music is being played and/or on the type of video content. For example, if a certain scene in the movie is very colorful such that the trimean or dominant color does not represent the video content well, the system might decide to go for more audio influenced color, even if the user, for example, selected similar audio and video weight ranges.

A step 303 comprises obtaining information relating to the video content and/or information relating to the audio content. The information related to the video content may comprise color information, for example. The information related to the audio content may comprise harmony, valence, energy, mood, and/or danceability information, for example. Valence, energy and danceability information are provided by Spotify, for example. Spotify's valence information is a measure from 0.0 to 1.0 describing the musical positiveness conveyed by a track. Tracks with high valence sound more positive (e.g. happy, cheerful, euphoric), while tracks with low valence sound more negative (e.g. sad, depressed, angry).

Spotify's energy information is a measure from 0.0 to 1.0 representing a perceptual measure of intensity and activity. Typically, energetic tracks feel fast, loud, and noisy. For example, death metal has high energy, while a Bach prelude scores low on the scale. Perceptual features contributing to this attribute include dynamic range, perceived loudness, timbre, onset rate, and general entropy. Spotify's danceability information describes how suitable a track is for dancing based on a combination of musical elements including tempo, rhythm stability, beat strength, and overall regularity. A value of 0.0 is least danceable and 1.0 is most danceable.

A step 305 comprises determining the one or more light effects to be rendered on one more light sources while the media content is being rendered. The one or more light effects are determined based on the information relating to the video content in dependence on the video weight and are determined based on the information relating to the audio content in dependence on the audio weight.

In the embodiment of FIG. 18, the one or more light effects are determined by determining a color, a start time and a duration of each of the one or more light effects and by assigning each of the one or more light effects to at least one of the one or more light sources. The color extraction method, the duration and the spatial assignment may be selected based on the video weight and the audio weight. As a first example, the color extraction method may be selected based on the valence or mood of the music or based on whether a scene is slow or fast (in terms of video content). As a second example, the duration of light effects may depend on whether a scene is slow or fast or may be determined so as to synchronize the light effects to the beats, bars and/or rhythm of the music.

As a third example, the used video analysis area for determining the color(s) for a certain light source may depend on the spatial location of this light source or the audio channel (e.g. left or right) used for determining the color(s) and/or duration(s) for a certain light source may depend on the spatial location of this light source. As a fourth example, if music is played only on the back audio channel(s)/speaker(s) in case of a surround sound system, only the light sources in the back (if the user has them) may render light effects based on information relating to the music content. If the user does not have light sources in the back, then none of the light effects may be based on information relating to the music content. Thus, the audio channels may be used to determine how to balance between video and audio driven light effect creation.

After step 305, a step 307 and/or a step 309 are performed. Step 307 comprises storing a light script specifying the one or more light effects. Step 309 comprises controlling the one or more light sources to render the one or more light effects.

Thus, a user may choose to weight the relative influence of the visual and musical content, and how each influences the resulting light effects. As an example, a value of −1 may mean a dependency only on music aspects, and a value of +1 may mean a dependency on the video content. Values in between will mean a "blending" of both contents and their influence on the light effects. If the value would be −1, the light effects may be determined solely by information obtained from the music contained in the media, for example. In that case, the light effects would not have any direct correlation with the visual part of the media, if present.

Different types of information obtained from the music may be separately exposed, allowing different weightings to be applied to each. For example, a user could choose the amount of influence the rhythmic aspects of the music track(s) has on the lighting effect.

The same approach may be applied to both light script generation and the real-time creation of light effects. The user may be offered, for example, several pre-sets with different audio/video weights, e.g. "music video" with high audio weight and/or "movie" with medium audio and video weights.

In order to determine which music tracks are part of a piece of media content, this information may be obtained from the Internet or from a content provider based on a title or other identifier of the media content or this information may be determined by locally analyzing the audio content, for example. This information may further include the positions of the music tracks in the piece of media content and contextual information about the music (e.g. harmony, valence, mood, energy, etc.).

Once this information is obtained, it may be used to set parameters for light effect generation according to a set of pre-defined rules. For example, a rule might specify an inverse relationship between the energy of a music track and smoothing, i.e. parts of a film containing music with low energy would have higher smoothing applied and vice-versa. Equally, this could apply to various sections of a single music track within the film.

Figure 19:
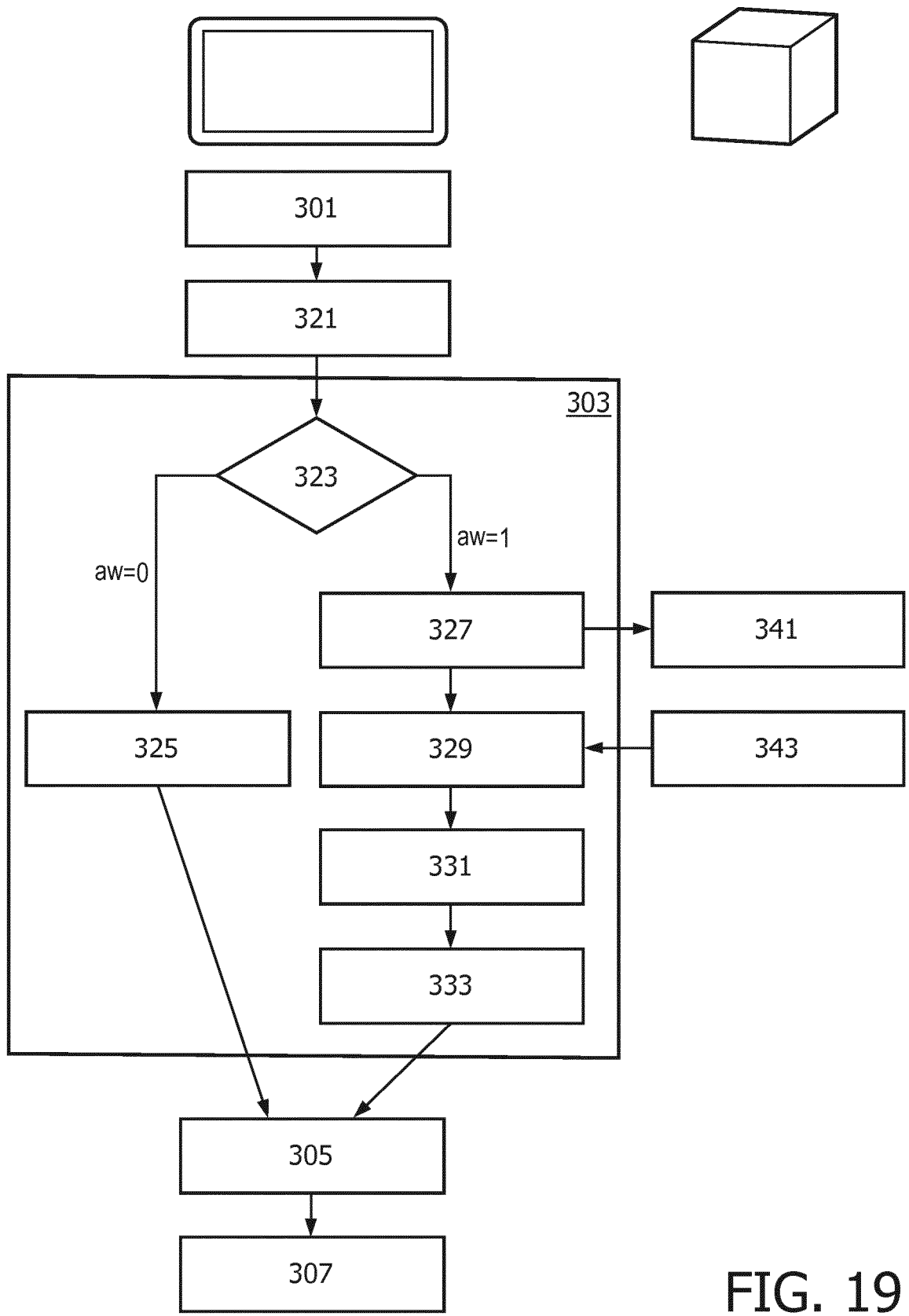
FIG. 19 is a flow diagram of a second embodiment of the weighted influence light effect creation method.

A second embodiment of the weighted influence light effect creation method is shown in FIG. 19. After step 301, see FIG. 18, has been performed, the video content is obtained in step 321, as the video content will be analyzed locally. In step 323, it is determined which step to perform next based on the audio and video weights. If the audio weight is zero, step 325 is performed next. If the audio weight is one, step 327 is performed next.

Step 325 comprises analyzing the video content, e.g. extracting colors from the video content, based on default parameters or based on parameters selected based on the video weight. Step 327 comprises transmitting a request for metadata relating to the audio content to an Internet server. Step 341 comprises the Internet server receiving the request and transmitting the requested metadata in response to the request in step 343. Step 329 comprises the system receiving the metadata.

Next, step 331 comprises the system determining parameters from the received metadata. Step 333 comprises the system analyzing the video content, e.g. extracting colors from the video content, based on the parameters determined in step 331. In step 305, the one or more light effects are determined based on the analysis of the video content. Step 307 comprises storing a light script specifying the one or more light effects.

Figure 20:
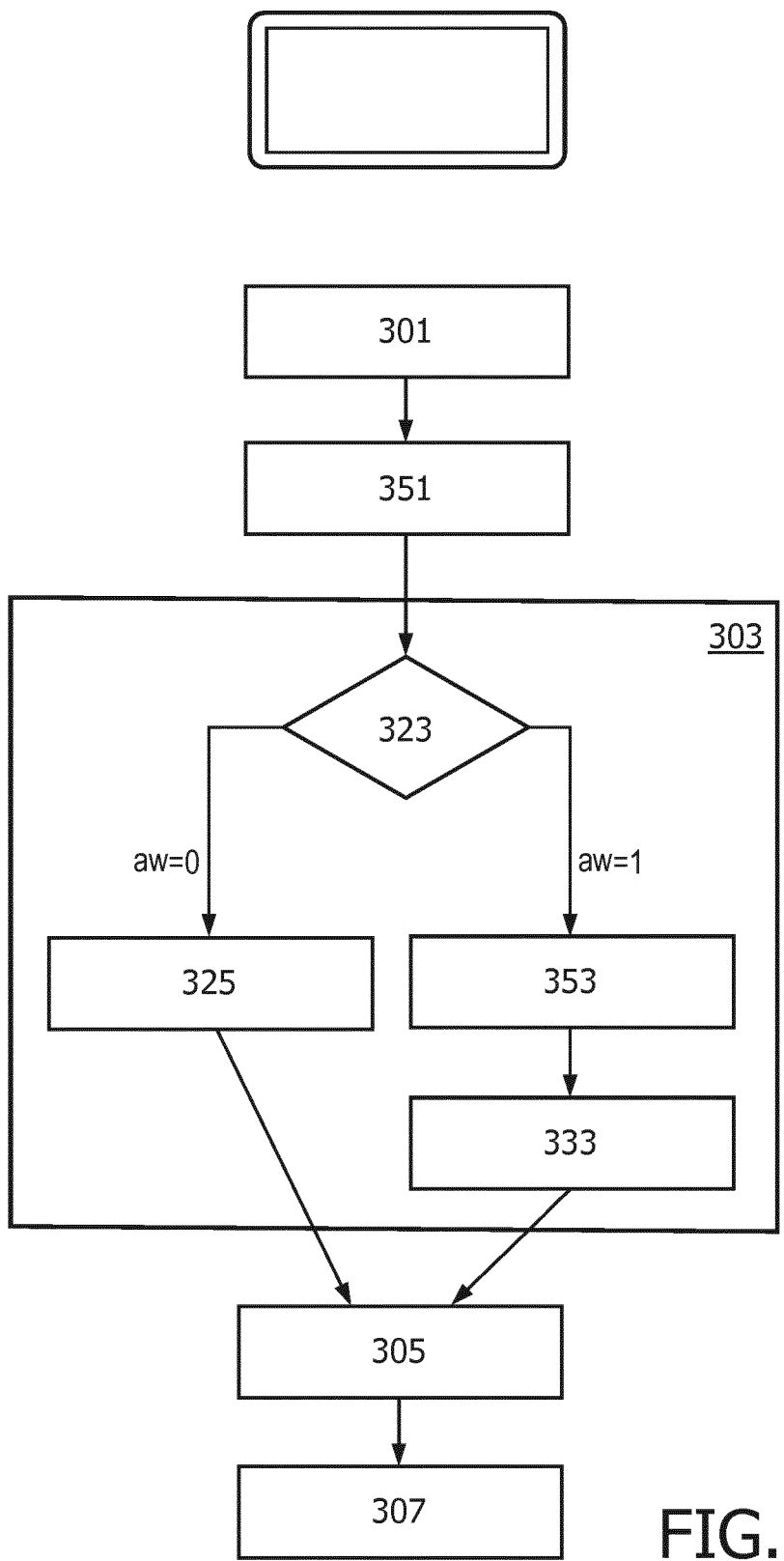
FIG. 20 is a flow diagram of a third embodiment of the weighted influence light effect creation method.

A third embodiment of the weighted influence light effect creation method is shown in FIG. 20. In the third embodiment of FIG. 20, no metadata related to the audio content is obtained from an Internet server, but local audio analysis is performed instead. For this reason, step 321 of FIG. 19 is replaced with a step 351 in which both the video and content are obtained. If it is determined in step 323 that the audio weight is one, step 353 is performed. Step 353 comprises analyzing the audio content and determining parameters from the audio content. These parameters are then used in step 333 to analyze the video content, e.g. extract colors from the video content.

In both the embodiment of FIG. 19 and the embodiment of FIG. 20, the video analysis is performed locally. In an alternative embodiment, metadata related to the video content is obtained from an Internet server.

Figure 21:
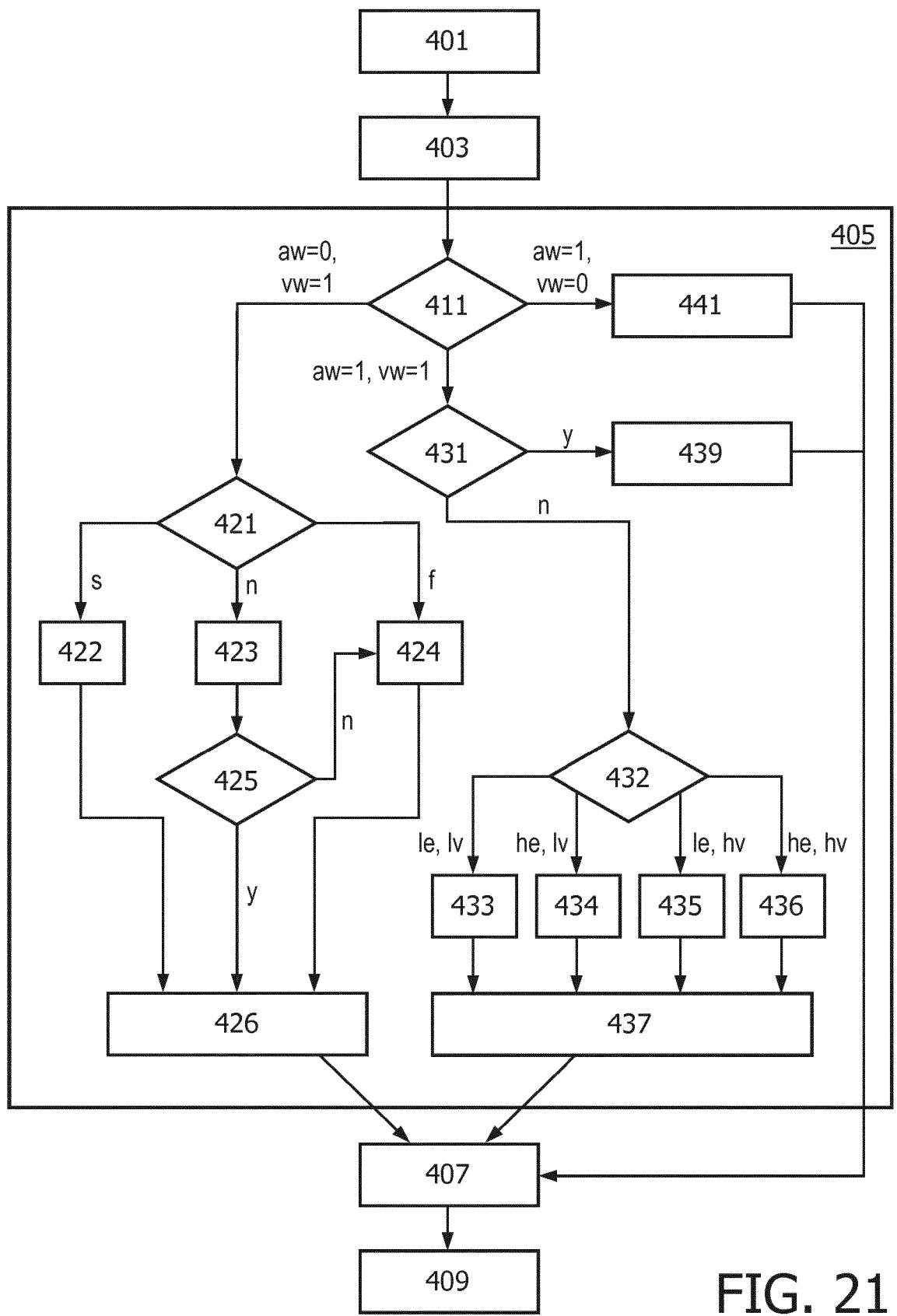
FIG. 21 is a flow diagram of a fifth embodiment of the offscreen color extraction method, a fifth embodiment of the color extraction selection method and a fourth embodiment of the weighted influence light effect creation method.

A fifth embodiment of the offscreen color extraction method, a fifth embodiment of the color extraction selection method and a fourth embodiment of the weighted influence light effect creation method is shown in FIG. 21. Step 401 is similar to step 301 of FIGS. 18 to 20. Step 401 comprises allowing a user to influence a video weight and an audio weight used for a determination of one or more light effects. Step 403 is similar to step 351 of FIG. 20. Step 403 comprising obtaining the video content and the audio content. Step 405 comprises obtaining information relating to the video content and/or information relating to the audio content, e.g. the music content.

In step 411, it is determined which step to perform next based on the audio and video weights. If the audio weight is zero and the video weight is one, step 421 is performed next. If the audio weight is one and the video weight is zero, step 441 is performed next. If the audio weight is one and the video weight is one, step 431 is performed next. In the embodiment of FIG. 21, the audio weight is zero or one and the video weight is zero or one. In an alternative embodiment, the audio weight and the video weight can be higher than one. In this alternative embodiment, step 421 could be performed if the audio weight is zero and the video weight is one or higher, step 441 could be performed if the audio weight is one or higher and the video weight is zero and step 431 could performed if the audio weight is one or higher and the video weight is one or higher, for example.

If step 421 is performed next, a color extraction method is selected from a plurality of color extraction methods based on the content of the video content (based on a local analysis of the video content or based on metadata obtained from an Internet server, for example). In this embodiment, the plurality of color extraction methods comprises different types of color extraction methods. Step 421 comprises determining whether a scene is a slow scene, a fast scene (an action scene) or a normal scene. This may involve detecting how many pixels move from one frame to the next frame and/or how fast pixels move from one frame to the next frame, e.g. based on the motion vectors typically used in compressed video. If a single motion value is determined based on this detection, two thresholds may be used to distinguish between a slow scene, a normal scene and a fast (action) scene.

In step 422, dominant color determination is selected for extracting a color from a scene upon determining that the obtained information indicates that the scene is a slow scene in step 421. The dominant color in the scene is typically the color that occurs most in the scene. For example, a color histogram may be made that shows per color the number of pixels that have this color and the color with the highest pixel count may be selected. An average color is typically different from the dominant color and might not even be a color that any of the pixels in the scene has.

In step 424, feature color determination (e.g. determining a color of a dominant feature like a car or a building) is selected for extracting a color from a scene upon determining that the obtained information indicates that the scene is an action scene in step 421. In step 423, trimean determination is selected for extracting a color from each frame upon determining that the obtained information indicates that the scene is a normal scene, i.e. neither a slow nor an action scene, in step 421. In this embodiment, a trimeans of the trimeans is determined to determine a color per scene from the colors per frame. A step 425 is performed after step 423.

Step 425 comprises determining whether the determined trimean results in a desired color. If so, step 426 is performed. If not, i.e. if the trimean determination results in an undesired color, feature color determination is selected for extracting a color from a scene in step 424. What colors are desired or undesired may be pre-configured or specified by a user. For example, dark colors may be undesired. Step 426 is also performed after steps 422 and 424. In step 426, one or more colors are extracted from the scene using the selected color extraction methods. A color may be determined per light source, e.g. using different analysis areas. In the embodiment of FIG. 21, the one or more colors are determined from onscreen content, as well as from offscreen content, as explained in relation to FIGS. 2,5,6 and 9.

In the embodiment of FIG. 21, feature color determination is selected if trimean determination would result in an undesired color. In an alternative embodiment feature color determination is alternatively or additionally selected if there is no dominant color in the one or more frames, and/or if a moving, sharp and/or high contrast object is detected in the one or more frames.

Step 431 comprises determining whether a light script is available for the music content and determining whether the music content comprises more than a certain amount of dialogue. If the light script is available and the music content comprises not more than the certain amount of dialogue, step 439 is performed. Step 439 comprises extracting parameters for the light effects from the light script, e.g. start times, durations and colors. Step 407 is performed after step 439.

If the light script is not available and/or the music content comprises more than the certain amount of dialogue, step 432 is performed. If step 432 is performed, then a color extraction method is selected based on the information related to the music content (information determined using local analysis of the audio content or obtained from an Internet server, for example). Step 432 comprises determining whether the music content comprises a low energy value or a high energy and determining whether the music content comprises a low valence value or a high valence value.

In the embodiment of FIG. 21, an energy value above a certain threshold is considered a high energy value, an energy value equal to or below this certain threshold is considered a low energy value, a valence value above a certain threshold is considered a high valence value and a valence value equal to or below this certain threshold is considered a low valence value. In an alternative embodiment, two thresholds may be used for energy and/or valence and a value between the two thresholds is a normal (energy or valence) value.

A first color extraction method is selected in step 433 if the energy value (of the music) is determined to be low and the valence value (of the music) is determined to be low in step 432. A second color extraction method is selected in step 434 if the energy value is determined to be high and the valence value is determined to be low in step 432. A third color extraction method is selected in step 435 if the energy value is determined to be low and the valence value is determined to be high in step 432. A fourth color extraction method is selected in step 436 if the energy value is determined to be high and the valence value is determined to be high in step 432. The valence of a music track represents the musical positiveness conveyed by the track and this information is provided by Spotify, for example.

The second and fourth color extraction methods selected in steps 434 and 436, respectively, involve a lower degree of smoothing than the first and third color extraction methods selected in steps 433 and 435, respectively Smoothing is used, for example, when determining a trimean of trimeans. The third and fourth color extraction methods selected in steps 435 and 436, respectively, determine colors which are more saturated than colors determined by the first and second color extraction methods selected in steps 433 and 434, respectively.

In step 437, one or more colors are extracted from the scene using the selected color extraction methods. A color may be determined per light source, e.g. using different analysis areas. In the embodiment of FIG. 21, the one or more colors are determined from onscreen content only. Step 441 comprises determining the start time and the duration of the one or more light effects such that the one or more light effects are synchronized with beats, bars, and/or a rhythm of the music content. Colors for the light effects may be determined based on the audio content, arbitrarily or in a predetermined order, for example. Step 407 is performed after step 441.

Steps 407 and 409 are similar to steps to steps 305 and 309 of FIG. 18, respectively. In step 407, the one or more light effects are determined based on extracted colors and/or any determined other parameters. Step 409 comprises controlling the one or more light sources to render the one or more light effects.

Figure 22:
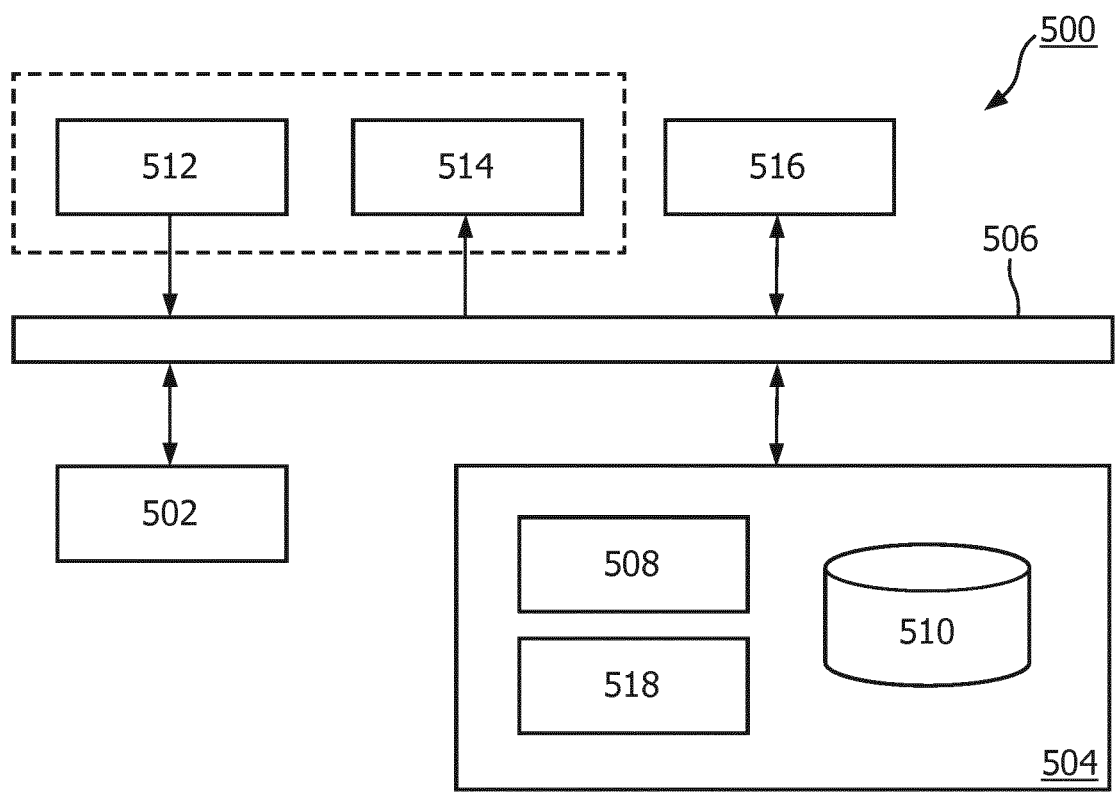
FIG. 22 is a block diagram of an exemplary data processing system for performing the method of the invention.

FIG. 22 depicts a block diagram illustrating an exemplary data processing system that may perform the method as described with reference to FIGS. 2, 5, 6, 9, 11-14, and 18-21.

As shown in FIG. 22, the data processing system 500 may include at least one processor 502 coupled to memory elements 504 through a system bus 506. As such, the data processing system may store program code within memory elements 504. Further, the processor 502 may execute the program code accessed from the memory elements 504 via a system bus 506. In one aspect, the data processing system may be implemented as a computer that is suitable for storing and/or executing program code. It should be appreciated, however, that the data processing system 500 may be implemented in the form of any system including a processor and a memory that can perform the functions described within this specification.

The memory elements 504 may include one or more physical memory devices such as, for example, local memory 508 and one or more bulk storage devices 510. The local memory may refer to random access memory or other non-persistent memory device(s) generally used during actual execution of the program code. A bulk storage device may be implemented as a hard drive or other persistent data storage device. The processing system 500 may also include one or more cache memories (not shown) that provide temporary storage of at least some program code in order to reduce the quantity of times program code must be retrieved from the bulk storage device 510 during execution. The processing system 500 may also be able to use memory elements of another processing system, e.g. if the processing system 500 is part of a cloud-computing platform.

Input/output (I/O) devices depicted as an input device 512 and an output device 514 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 22 with a dashed line surrounding the input device 512 and the output device 514). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 516 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 500, and a data transmitter for transmitting data from the data processing system 500 to said systems, devices and/or networks. Modems, cable modems, and Ethernet cards are examples of different types of network adapter that may be used with the data processing system 300.

As pictured in FIG. 22, the memory elements 504 may store an application 518. In various embodiments, the application 518 may be stored in the local memory 508, the one or more bulk storage devices 510, or separate from the local memory and the bulk storage devices. It should be appreciated that the data processing system 500 may further execute an operating system (not shown in FIG. 22) that can facilitate execution of the application 518. The application 518, being implemented in the form of executable program code, can be executed by the data processing system 500, e.g., by the processor 502. Responsive to executing the application, the data processing system 500 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 502 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for determining one or more light effects based on an analysis of media content, said media content comprising video content and audio content and said system comprising:
   at least one input interface;
   at least one output interface; and
   at least one processor configured to:
   use said at least one input interface to allow a user to influence a video weight and an audio weight used for a determination of one or more light effects, said video weight representing a weight of said video content in said determination of said one or more light effects and said audio weight representing a weight of said audio content in said determination,
   use said at least one input interface to obtain information relating to said video content and/or information relating to said audio content,
   determine said one or more light effects to be rendered on one more light sources while said media content is being rendered, said one or more light effects being determined based on said information relating to said video content in dependence on said video weight and being determined based on said information relating to said audio content in dependence on said audio weight, and use said at least one output interface to control said one or more light sources to render said one or more light effects and/or store a light script specifying said one or more light effects, wherein said information related to said video content comprises color information extracted from said video content and said at least one processor is configured to determine colors from said color information by using a certain color extraction method, and wherein said certain color extraction method is selected based on at least said information related to said audio content if said video weight has a certain non-zero value and said audio weight has a certain non-zero value.

2. A system as claimed in claim 1, wherein said video weight comprises a plurality of weight components for different types of video information and/or said audio weight comprises a plurality of weight components for different types of audio information.

3. A system as claimed in claim 1, wherein said at least one processor is configured to determine whether said video weight and said audio weight have certain values non-zero, determine whether a light script is available for said audio content and use said at least one output interface to control said one or more light sources to render light effects specified in said available light script upon determining that said video weight and said audio weight have said certain non-zero values and said light script is available.

4. A system as claimed in claim 3, wherein said at least one processor is configured to determine whether said audio content comprises more than a certain amount of dialogue and use said at least said at least one output interface to control said one or more light sources to render said light effects specified in said available light script upon determining that said video weight and said audio weight have said certain non-zero values, said light script is available and said audio content comprises not more than said certain amount of dialogue.

5. A system as claimed in claim 1, wherein said information related to said audio content comprises harmony, valence, energy, mood, and/or danceability information and/or said information related to said video content comprises color information.

6. A system as claimed in claim 1, wherein said at least one processor is configured to determine said one or more light effects by determining a color, a start time and a duration of each of said one or more light effects.

7. A system as claimed in claim 6, wherein said at least one processor is configured to further determine said one or more light effects by assigning each of said one or more light effects to at least one of said one or more light sources.

8. A system as claimed in claim 6, wherein said start time and said duration of said one or more light effects are determined such that said one or more light effects are synchronized with beats, bars, and/or a rhythm of music in said audio content if said video weight has a zero value.

9. A system as claimed in claim 8, wherein a first color extraction method is selected if said information related to said audio content comprises a first energy value and a second color extraction method is selected if said information related to said audio content comprises a second energy value, said second energy value being higher than said first energy value and said second color extraction method involving a lower degree of smoothing than said first color extraction method.

10. A system as claimed in claim 8, wherein a first color extraction method is selected if said information related to said audio content comprises a first valence value and a second color extraction method is selected if said information related to said audio content comprises a second valence value, said second valence value being higher than said first valence value and said second color extraction method determines colors which are more saturated than colors determined by said first color extraction method.

11. A lighting system comprising the system of claim 1 and said one or more light sources.

12. A lighting system according to claim 11, further comprising:
a mobile device comprising the processor, and
a bridge, wherein the bridge is configured to wirelessly communicate with said one or more light sources and said mobile device for controlling the one or more light sources by the mobile device.

13. A method of determining one or more light effects based on an analysis of media content, said media content comprising video content and audio content and said method comprising:
allowing a user to influence a video weight and an audio weight used for a determination of one or more light effects, said video weight representing a weight of said video content in said determination of said one or more light effects and said audio weight representing a weight of said audio content in said determination;
obtaining information relating to said video content and/or information relating to said audio content;
determining said one or more light effects to be rendered on one more light sources while said media content is being rendered, said one or more light effects being determined based on said information relating to said video content in dependence on said video weight and being determined based on said information relating to said audio content in dependence on said audio weight; and
storing a light script specifying said one or more light effects and/or controlling said one or more light sources to render said one or more light effects,
wherein said information related to said video content comprises color information extracted from said video content and said at least one processor is configured to determine colors from said color information by using a certain color extraction method, and
wherein said certain color extraction method is selected based on at least said information related to said audio content if said video weight has a certain non-zero value and said audio weight has a certain non-zero value.

14. A method of determining one or more light effects based on an analysis of media content according to claim 13, wherein a first color extraction method is selected if said information related to said audio content comprises a first energy value and a second color extraction method is selected if said information related to said audio content comprises a second energy value, said second energy value being higher than said first energy value and said second color extraction method involving a lower degree of smoothing than said first color extraction method.

15. A non-transitory computer-readable medium on which are stored a plurality of non-transitory computer-readable instructions that when executed on a processor are configured to perform the steps comprising the method as defined in claim 13.

* * * * *